(12) United States Patent
Shiohara et al.

(10) Patent No.: US 12,260,209 B2
(45) Date of Patent: Mar. 25, 2025

(54) IN-VEHICLE SYSTEM AND CONTROL DEVICE

(71) Applicant: TOYOTA JIDOSHA KABUSHIKI KAISHA, Toyota (JP)

(72) Inventors: Kazuyoshi Shiohara, Nagoya (JP); Masaki Miyake, Toyota (JP); Takayuki Fujimoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/164,181

(22) Filed: Feb. 3, 2023

(65) Prior Publication Data

US 2023/0315429 A1 Oct. 5, 2023

(30) Foreign Application Priority Data

Mar. 31, 2022 (JP) .................................. 2022-059407

(51) Int. Cl.
*G06F 8/65* (2018.01)
*G07C 5/00* (2006.01)

(52) U.S. Cl.
CPC .............. *G06F 8/65* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 2016/0170775 A1* | 6/2016 | Rockwell ............ | G06F 13/4282 713/100 |
| 2018/0341476 A1* | 11/2018 | Kitao ................... | H04L 67/1097 |
| 2019/0278582 A1* | 9/2019 | Miyake ................ | G06F 21/57 |
| 2020/0249930 A1* | 8/2020 | Abe ..................... | G06F 9/4401 |
| 2023/0315429 A1* | 10/2023 | Shiohara ............. | G07C 5/008 717/168 |

FOREIGN PATENT DOCUMENTS

| | | |
|---|---|---|
| JP | 2015-5041 A | 1/2015 |
| JP | 2019-159399 A | 9/2019 |
| JP | 2020-123253 A | 8/2020 |
| JP | 7081223 B2 | 6/2022 |

OTHER PUBLICATIONS

Bielawski, "Cybersecurity of Firmware Updates", 2020, NHTSA (Year: 2020).*

* cited by examiner

*Primary Examiner* — Hossain M Morshed
(74) *Attorney, Agent, or Firm* — Oblon, McClelland, Maier & Neustadt, L.L.P.

(57) ABSTRACT

A plurality of control devices include a master control device and a slave control device. The master control device transmits, when software stored in a storage area different from the start storage area is updated in the slave control device, to the slave control device, a switching instruction for setting the storage area that stores the updated software as the start storage area. The slave control device implements, when receiving the switching instruction, setting of the storage area as the start storage area at a time of a next start, and requests, at every start, the master control device to execute consistency determination processing for determining whether pieces of identification information of the software stored in the start storage areas are consistent between the control devices. The master control device executes, when receiving the request from the slave control device, the consistency determination processing.

9 Claims, 13 Drawing Sheets

IN-VEHICLE SYSTEM AND CONTROL DEVICE

CROSS-REFERENCE TO RELATED APPLICATION

This application claims priority to Japanese Patent Application No. 2022-059407 filed on Mar. 31, 2022, incorporated herein by reference in its entirety.

BACKGROUND

1. Technical Field

The present disclosure relates to an in-vehicle system and a control device.

2. Description of Related Art

A vehicle has an in-vehicle system that includes a plurality of actuators and a plurality of control devices that controls each of the actuators. Functions of the control devices may be realized by software. By being realized by software, it is possible to correct or add functions by receiving provision of update programs even after they are put on the market. Further, for the correction or addition of the functions that are executed in cooperation with the control devices, such as various pieces of driving assistance, such as autonomous driving, it is required to update software of all target control devices and to confirm whether the update in each control device has been appropriately executed.

For example, Japanese Unexamined Patent Application Publication No. 2020-123253 discloses a technology for determining whether a combination of each software of the ECUs is consistent by comparing identification information of a list stored in a storage unit of each ECU at a time of a start of the in-vehicle system.

SUMMARY

The execution of the updated software may be executed at the time of the next start of the in-vehicle system in order to simultaneously switch from pre-updated software in the ECUs. In that case, whether the software has been appropriately updated is also confirmed at the time of a next start of the in-vehicle system.

However, when only some of the control devices from among the control devices are restarted due to some trouble, such as momentary failure of a power source, before the time of the next start of the in-vehicle system, the updated software is executed only in the some part of the control devices that are restarted and an inconsistent state of a combination of software identification information in the control devices is continued at least until the in-vehicle system is started next time, such that a correction or an addition of a function may not be appropriately implemented.

The present disclosure provides an in-vehicle system and a control device that early detect inconsistency in a combination of software identification information in the control devices.

An in-vehicle system according to a first aspect of the present disclosure includes a plurality of control devices. Each of the control devices is configured to set, as a start storage area, any one of a plurality of storage areas set as storage areas that store software, and to be started using the software stored in the start storage area. The control devices include a master control device and a slave control device. The master control unit is configured to, when software stored in a storage area different from the start storage area is updated in the slave control device, transmit, to the slave control device, a switching instruction for setting the storage area that stores the updated software as the start storage area. The slave control device is configured to, when receiving the switching instruction, implement setting of the start storage area at a time of a next start, and request, at every start, the master control device to execute consistency determination processing for determining whether pieces of identification information of the software stored in the start storage area are consistent between the control devices. The master control device is configured to, when receiving the request for the execution of the consistency determination processing from the slave control device, execute the consistency determination processing.

In this manner, the master control device is requested to execute the consistency determination processing and executes the consistency determination processing at every start of the slave control device. For this reason, in the case where the storage area that stores the updated software is set as the start storage area at the time of the next start, even when only the slave control device is restarted due to trouble or the like, the master control device is requested to execute the consistency determination processing at the time of the restart. As such, it is possible to early detect inconsistency in a combination of the identification information of the software in the control devices.

In the first aspect, the master control device may be configured to prohibit, when determining that the pieces of identification information of the software stored in the start storage area are not consistent between the control devices, execution of a function implemented by the software.

In this manner, it is possible to restrict the function to be realized by the software from being executed in a state where the combination of the identification information of the software is not consistent in the control devices.

In the first aspect, the master control device may be configured to transmit a completion notification to the slave control device after completion of the consistency determination processing. The slave control device may be configured to determine, using the completion notification, to determine whether to request the execution of the consistency determination processing.

In this manner, when, for example, there is a plurality of requests for the execution of the consistency determination processing for the master control device, it is possible to restrict the consistency determination processing from being unnecessarily executed.

In the first aspect, the slave control device may be configured to request the master control device to determine executability of the consistency determination processing at a time of the start, and determine, using a determination result of the executability and the completion notification from the master control device, whether to request the execution of the consistency determination processing.

In this manner, by requesting for the determination of the executability before requesting for the execution of the consistency determination processing, it is possible to restrict the unnecessary execution of the consistency determination processing from being requested.

In the first aspect, the slave control device may include a first control device and a second control device. When receiving the request for the determination of the executability from the first control device in a case where the request for the determination of the executability is not received from the second control device before the first control device, the master control device may be configured to transmit, to the first control device, a determination result indicating the executability of the consistency determination processing.

In this manner, by transmitting the determination result indicating the executability of the consistency determination processing to the first control device from which the determination request is received before the second control device, the master control device can execute the consistency determination processing in response to the request from the first control device.

In the first aspect, when receiving the request for the determination of the executability from the second control device after the request for the determination of the executability from the first control device, the master control device may be configured to prohibit a transmission of the determination result to the second control device.

In this manner, it is possible to restrict both the first control device and the second control device from requesting the execution of the consistency determination processing.

In the first aspect, the master control device may be configured to transmit, to the master control device, a first completion notification of the consistency determination processing that is executed at a time of a start and a second completion notification of the consistency determination processing that is executed when the execution of the consistency determination processing is requested from the slave control device. The slave control device may be configured to stop, when receiving the first completion notification and the second completion notification, requesting the execution of the consistency determination processing, and request, when not receiving the first completion notification, the execution of the consistency determination processing.

In this manner, it is possible to restrict the slave control device from requesting the unnecessary execution of the consistency determination processing.

A control device according to a second aspect of the present disclosure is any control device from among a plurality of control devices configured to set, as a start storage area, any one of a plurality of storage areas set as storage areas that store software, and to be started using the software stored in the start storage area. The control device includes one or more processors configured to transmit, when software stored in a storage area different from the start storage area is updated in another control device, to the other control device, a switching instruction for setting the storage area that stores the updated software as the start storage area, receive, at every start of the other control device, a request for execution of consistency determination processing for determining whether pieces of identification information of the software stored in the start storage area are consistent between the control devices, and execute, when receiving the request for the execution of the consistency determination processing from the other control device, the consistency determination processing. When receiving the switching instruction, the other control device is configured to implement setting of the start storage area at a time of a next start.

A control device according to a third aspect of the present disclosure is any control device from among a plurality of control devices configured to set, as a start storage area, any one of a plurality of storage areas set as storage areas that store software, and to be started using the software stored in the start storage area. The control device includes one or more processors configured to implement, when software stored in a storage area different from the start storage area is updated and a switching instruction for setting the storage area that stores the updated software as the start storage area is received, setting of the start storage area at a time of a next start, and request, at every start, a master control device that is any one of the control devices to execute consistency determination processing for determining whether pieces of identification information of the software stored in the start storage area are consistent between the control devices. When receiving the request for the execution of the consistency determination processing from the control device, the master control device is configured to execute the consistency determination processing.

With each aspect of the present disclosure, it is possible to provide an in-vehicle system and a plurality of control devices that early detect inconsistency in a combination of software identification information in the control devices.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
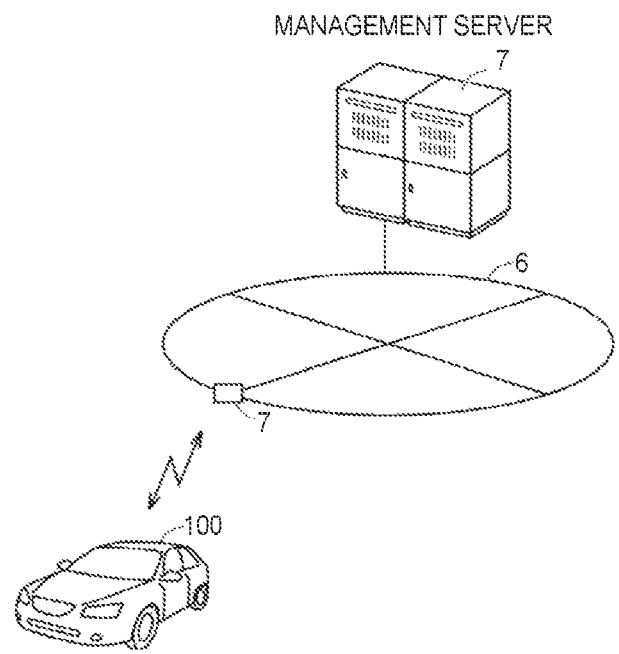
FIG. 1 is a diagram for describing an example of a configuration of a communication system.

Hereinafter, embodiments of the present disclosure will be described in detail with reference to the drawings. The same or corresponding parts in the drawings are denoted by the same reference signs, and the description thereof is not repeated.

FIG. 1 is a diagram for describing an example of a configuration of a communication system 1. As illustrated in FIG. 1, the communication system 1 includes a management server 7, a communication network 6, and an electrified vehicle 100 that can communicate with the management server 7 via the communication network 6.

The management server 7 may be, for example, a computer including a central processing unit (CPU), various memories, and a communication interface. The management server 7 provides update information of various pieces of software to a plurality of vehicles or manages an update status of the various pieces of software stored in each of the vehicles. FIG. 1 illustrates, as an example, the electrified vehicle 100, which is one of the vehicles. In the following description, information exchanged between the management server 7 and the electrified vehicle 100 is described. However, since information exchanged between the management server 7 and other vehicles is the same, detailed description thereof is not repeated.

A storage device (not shown) of the management server 7 stores, in advance, for example, identification information (hereinafter, referred to as a vehicle ID), which is unique information for identifying the electrified vehicle 100. Various pieces of software stored in the electrified vehicle 100 include, for example, control programs respectively stored in a plurality of electronic control units (ECUs) mounted on the electrified vehicle 100. The management server 7 manages identification information including version information of the various pieces of software for each ECU of the electrified vehicle 100. The storage device of the management server 7 stores version information of software of a master ECU and version information of software of a slave ECU included in the electrified vehicle 100 in association with the vehicle ID, as described below. The management server 7 manages version information of the software using a unique item numbers. Upon providing update information to the electrified vehicle 100, the management server 7 manages update statuses of the various pieces of software in the electrified vehicle 100 using an item number corresponding to the provided update information.

For example, when software with a new item number (a new version) is prepared, the management server 7 requests the electrified vehicle 100 for update a control program, or provides the electrified vehicle 100 with the software with the new item number in response to a request from the electrified vehicle 100.

Figure 2:
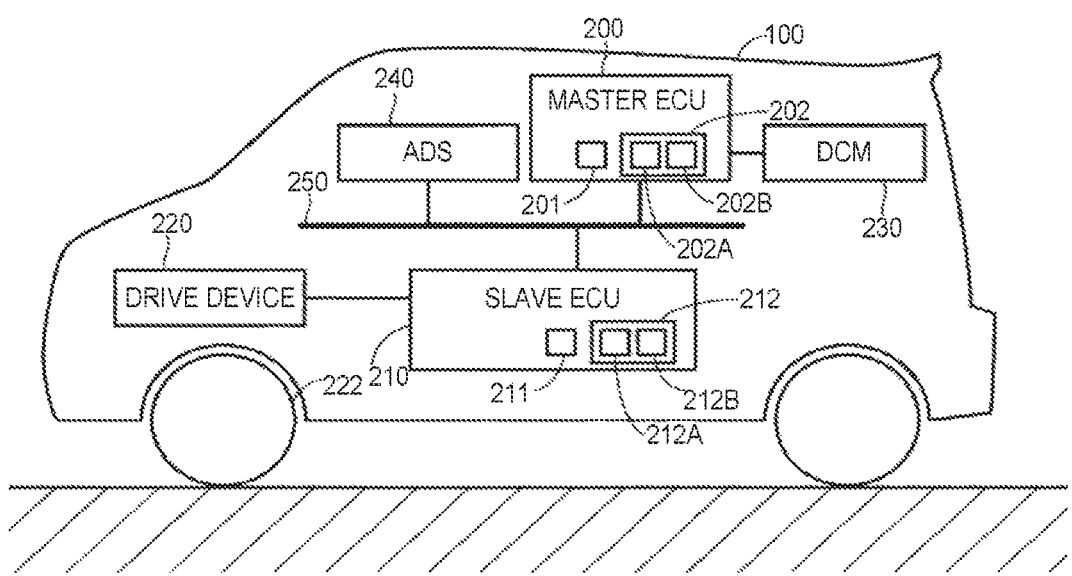
FIG. 2 is a diagram schematically illustrating an example of a configuration of an electrified vehicle in the present embodiment.

Next, a specific configuration of the electrified vehicle 100 in the present embodiment is described with reference to FIG. 2. FIG. 2 is a diagram schematically illustrating an example of a configuration of the electrified vehicle 100 in the present embodiment. As illustrated in FIG. 2, the electrified vehicle 100 includes a master ECU 200, a slave ECU 210, a drive device 220, a data communication module (DCM) 230, an autonomous driving system (ADS) 240, and a communication bus 250. The master ECU 200, the slave ECU 210, and the ADS 240 are communicably connected via the communication bus 250.

The master ECU 200 instructs the slave ECU 210 to switch to software with an updated item number, described below, or manages the update status of software of each ECU including the mater ECU 200 itself. The master ECU 200 corresponds to a "master control device".

The master ECU 200 includes a CPU 201 and a memory 202. The master ECU 200 may include a plurality of CPUs 201, and may include a plurality of memories 202. When the CPU 201 executes a program stored in the memory 202, various pieces of control are executed on a control target of the master ECU 200 (for example, the DCM 230). The memory 202 includes a first storage area 202A and a second storage area 202B. A control program for starting the master ECU 200 is stored in both the first storage area 202A and the second storage area 202B. The master ECU 200 sets one of the first storage area 202A and the second storage area 202B as a start storage area, and is, at the time of the start, started with executing the control program stored in the set start storage area at the time of the start. Upon receiving the update information from the management server 7 via the DCM 230, the master ECU 200 stores the control program that is updated using the update information in a storage area (hereinafter, sometimes referred to as an "update storage area") other than the storage area set as the start storage area. When the updated program is stored in the update storage area, the master ECU 200 sets the update storage area as the start storage area at the time of the next start, and also instructs the slave ECU 210 described below to set the update storage area as the start storage area at the time of the next start.

For this reason, when the electrified vehicle 100 becomes IG-ON (a power source is in an on state) by a user's operation or the like after it becomes IG-off (the power source is an off state), each of the master ECU 200 and the slave ECU 210 is started with executing the updated control program stored in the start storage area. The storage area set as the start storage area until the time of the start is set as the update storage area. Hereinafter, changing and newly setting the start storage area may be referred to as switching the start storage area.

The master ECU 200 acquires the item number (hereinafter, referred to as an updated item number) of the updated control program stored in the slave ECU 210 from the management server 7 or the slave ECU 210, and stores it in the memory 202. Further, the master ECU 200 acquires the item number (hereinafter, referred to as an execution item number) of the control program being executed from the slave ECU 210 described below, and stores it in the memory 202.

The DCM 230 is an in-vehicle communication module configured to be able to wirelessly communicate with the management server 7. The DCM 230 is configured to be able to execute bidirectional data communication with the management server 7 according to a control signal from the master ECU 200. The DCM 230 is connected to the master ECU 200. Via the DCM 230, the master ECU 200 transmits, for example, various requests or information on the electrified vehicle 100 to the management server 7, or receives update information of various pieces of software from the management server 7.

The slave ECU 210 includes a CPU 211 and a memory 212. The slave ECU 210 may include a plurality of the CPUs 211, and may include a plurality of the memories 212. The slave ECU 210 corresponds to the "slave control device". When the CPU 211 executes a program stored in the memory 212, various pieces of control are executed on a control target of the slave ECU 210 (for example, the drive device 220). The memory 212 includes a third storage area 212A and a fourth storage area 212B. A control program for starting the slave ECU 210 is stored in both the third storage area 212A and the fourth storage area 212B. The slave ECU 210 sets one of the third storage area 212A and the fourth storage area 212B as a start storage area, and is, at time of the start, started with executing the control program stored in the set start storage area. Upon receiving provision of the update information from the management server 7 via the DCM 230 and receiving an instruction for switching the start storage area from the master ECU 200, the slave ECU 210 sets the update storage area as the start storage area at the time of the next start.

The drive device 220 is connected to the slave ECU 210 and executes a drive operation for driving the electrified vehicle 100 according to a control signal from the slave ECU 210. The drive device 220 includes, for example, a motor generator, a power accumulation device, and a power control unit (PCU) (none of which shown). The power accumulation device includes, for example, a secondary battery, such as a nickel-hydrogen battery or a lithium-ion battery having a liquid or solid electrolyte, or a direct current power source, such as a capacitor. The PCU converts direct current power of the power accumulation device into alternating current power and supplies it to the motor generator, or converts alternating current power generated by the motor generator into direct current power and supplies it to the power accumulation device. The motor generator is a drive source and a power generation source of the electrified vehicle 100, and causes drive wheels to rotate or generates power by the rotation of the drive wheels. The drive device 220 may further include an internal combustion engine as a drive source or a power generation source.

The ADS 240 is configured to enable autonomous driving of the electrified vehicle 100. Specifically, the ADS 240 acquires information (surrounding environment) indicating a state of the electrified vehicle 100 from the master ECU 200, the slave ECU 210, and various sensors, and creates a traveling plan using, for example, the acquired information or a destination. The ADS 240 outputs various control requests for causing the electrified vehicle 100 to travel according to the created traveling plan to the master ECU 200 and the slave ECU 210 that control various actuators including the drive device 220.

In the present embodiment, the ADS 240 is described as being built into the electrified vehicle 100, but it may be capable of being installed at a position decided in advance, such as a rooftop of the electrified vehicle 100 and may be composed of an autonomous driving kit that can be removed from the electrified vehicle 100.

In the electrified vehicle 100, driving is executed by any one of an autonomous driving mode in which the autonomous driving can be implemented according to a control request from the ADS 240, and a manual driving mode in which driving can be implemented according to various operations (for example, an accelerator operation, a brake operation, and a steering operation) by a user. As described above, the case where the master ECU 200 has the DCM 230 as the control target and the slave ECU 210 has the drive device 220 as the control target has been described as an example, but other actuators mounted on the electrified vehicle 100 are controlled by at least one of the master ECU 200 and the slave ECU 210.

In the electrified vehicle 100 configured as above, the function of each of the master ECU 200 and the slave ECU 210 is realized by executing software as described above. Then, the software stored in each of the master ECU 200 and the slave ECU 210 is updated using the update information received from the management server 7, and can correct an existing function or add a new function. In order to appropriately execute the function by these pieces of updated software, the master ECU 200 executes consistency determination processing (hereinafter, sometimes referred to as a "version consistency check (VMC)" for confirming whether a combination of the execution item numbers of the software executed in the master ECU 200 and the slave ECU 210 is consistence after, for example, IG-ON.

When, for example, the combination of the execution item numbers in the master ECU 200 and the slave ECU 210 is a combination decided in advance, the master ECU 200 determines that the combination of the execution item numbers is consistent. The combination decided in advance includes, for example, a combination of item numbers before and after the update. When, for example, the combination of the execution item numbers matches the combination of the update item numbers, the master ECU 200 can confirm that switching of the start storage area is appropriately executed.

Figure 3:
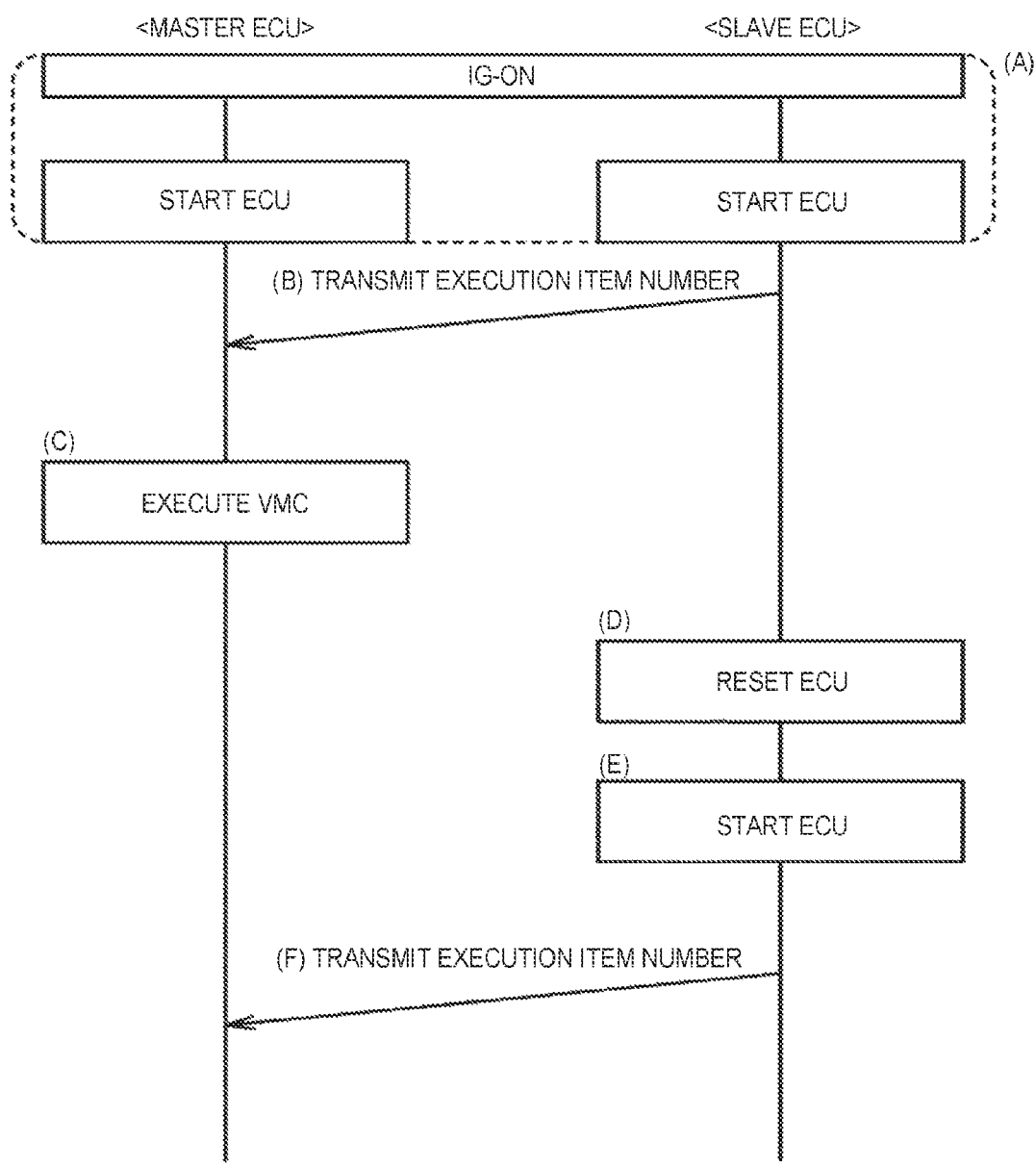
FIG. 3 is a diagram for describing an example of operations executed by a master ECU and a slave ECU.

FIG. 3 is a diagram for describing an example of operations executed by the master ECU 200 and the slave ECU 210. FIG. 3 illustrates operation histories of the master ECU 200 and the slave ECU 210.

For example, when the user executes a start operation for starting a system of the electrified vehicle 100, as illustrated in (A) of FIG. 3, the electrified vehicle 100 becomes IG-ON. When the electrified vehicle 100 becomes IG-ON, power is supplied from a power source to each of the master ECU 200 and the slave ECU 210 and the master ECU 200 and the slave ECU 210 are started.

At this time, for example, as illustrated in (B) of FIG. 3, it is assumed that the slave ECU 210 transmits the execution item number to the master ECU 200 after the start. The slave ECU 210 transmits, to master ECU 200, for example, the item number of the software stored in the start storage area after the start as the execution item number. A well-known technique may be used as a method for acquiring the item number of the software stored in the start storage area, and detailed description thereof is not given.

As illustrated in (C) of FIG. 3, after the electrified vehicle 100 becomes IG-ON, the master ECU 200 executes VMC by receiving the execution item number from the slave ECU 210 for the first time. As such, the master ECU 200 can determine whether the combination of the execution item numbers is consistent according to whether a combination of a first execution item number of software being executed in the master ECU 200 and a received second execution item number of the software being executed in the slave ECU 210 is a combination decided in advance.

The master ECU 200 may acquire, for example, configuration information on the combination decided in advance from the management server 7, or may acquire, as the configuration information, the combination of the item numbers before and after the update, using the update information received from the management server 7.

However, when the slave ECU 210 is restarted due to an occurrence of some trouble, such as momentary failure of a power source that supplies power to the slave ECU 210 after the master ECU 200 instructs the slave ECU 210 to switch the start storage area at the time of the next start and before the electrified vehicle 100 becomes IG-OFF, the switching of the start storage area may be executed only in the slave ECU 210.

For example, as illustrated in (D) of FIG. 3, when the slave ECU 210 is reset due to an occurrence of some trouble, as illustrated in (E) of FIG. 3, the slave ECU 210 is restarted. At this time, as illustrated in (F) of FIG. 3, even when the execution item number is transferred to the master ECU 200, VMC is not executed in the master ECU 200. For this reason, since the execution item number of the master ECU 200 becomes the item number before the update and the execution item number of the slave ECU 210 becomes the item number after the update before the time of the next start of the master ECU 200, a period in which the combination of the execution item numbers between the master ECU 200 and the slave ECU 210 becomes inconsistent occurs.

Figure 4:
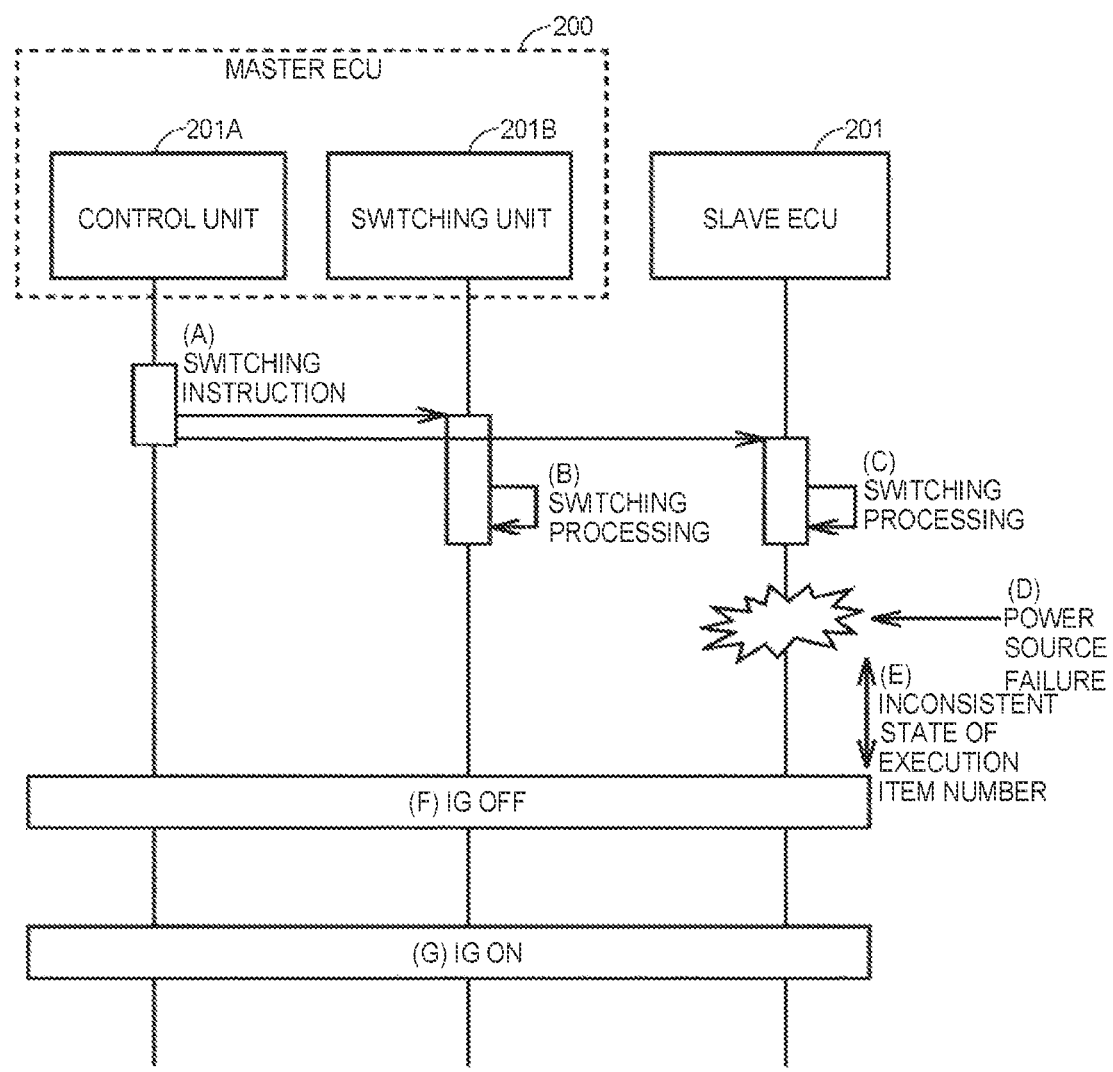
FIG. 4 is a diagram for describing an example of operations when a combination of execution item numbers between the master ECU and the slave ECU is inconsistent.

FIG. 4 is a diagram for describing an example of operations when the combination of the execution numbers between the master ECU 200 and the slave ECU 210 becomes inconsistent. As illustrated in FIG. 4, the master ECU 200 includes a control unit 201A and a switching unit 201B. When the updated software is stored in the update storage area, as illustrated in (A) of FIG. 4, the control unit 201A transmits a switching instruction to the slave ECU 210 and the switching unit 201B in the master ECU 200. Upon receiving the switching instruction from the control unit 201A, as illustrated in (B) and (C) of FIG. 4, the switching unit 201B and the slave ECU 210 respectively execute switching processing of the start storage area and set the update storage area as the start storage area at the time of the next start (corresponds to the time of the IG-ON illustrated in (G) of FIG. 4.

However, as illustrated in (D) of FIG. 4 thereafter, when momentary failure of the power source occurs in the slave ECU 210, only the slave ECU 210 is restarted. As a result, since the slave ECU 210 is started using the updated software, in a period until a timing in which the electrified vehicle 100 becomes IG-OFF as illustrated in (F) of FIG. 4, the execution item number of the master ECU 200 becomes the item number of the software before the update, and the execution item number of the slave ECU 210 becomes the item number of the software after the update. For this reason, a period in which the combination of the execution item numbers becomes inconsistent occurs.

Then, in the present embodiment, at the time of the start of the slave ECU 210, the slave ECU 210 requests the master ECU 200 to execute the consistency determination processing for determining whether the identification information (that is, the execution item number) of the software stored in the start storage area is consistent between the master ECU 200 and the slave ECU 210. In each of when the master ECU 200 is started and when it receives the request for the execution of the consistency determination processing from the slave ECU 210, the master ECU 200 executes the consistency determination processing (VMC).

In this manner, the master ECU 200 is requested to execute the consistency determination processing at the time of the start of the slave ECU 210 and executes the consistency determination processing. For this reason, in the case where the update storage area is set as the start storage area at the time of the next start, even when only the slave ECU 210 is restarted due to trouble or the like, the master ECU 200 is requested to execute the consistency determination processing at the time of restart. As such, it is possible to early detect the inconsistency in the combination of the execution item numbers between the master ECU 200 and the slave ECU 210.

Figure 5:
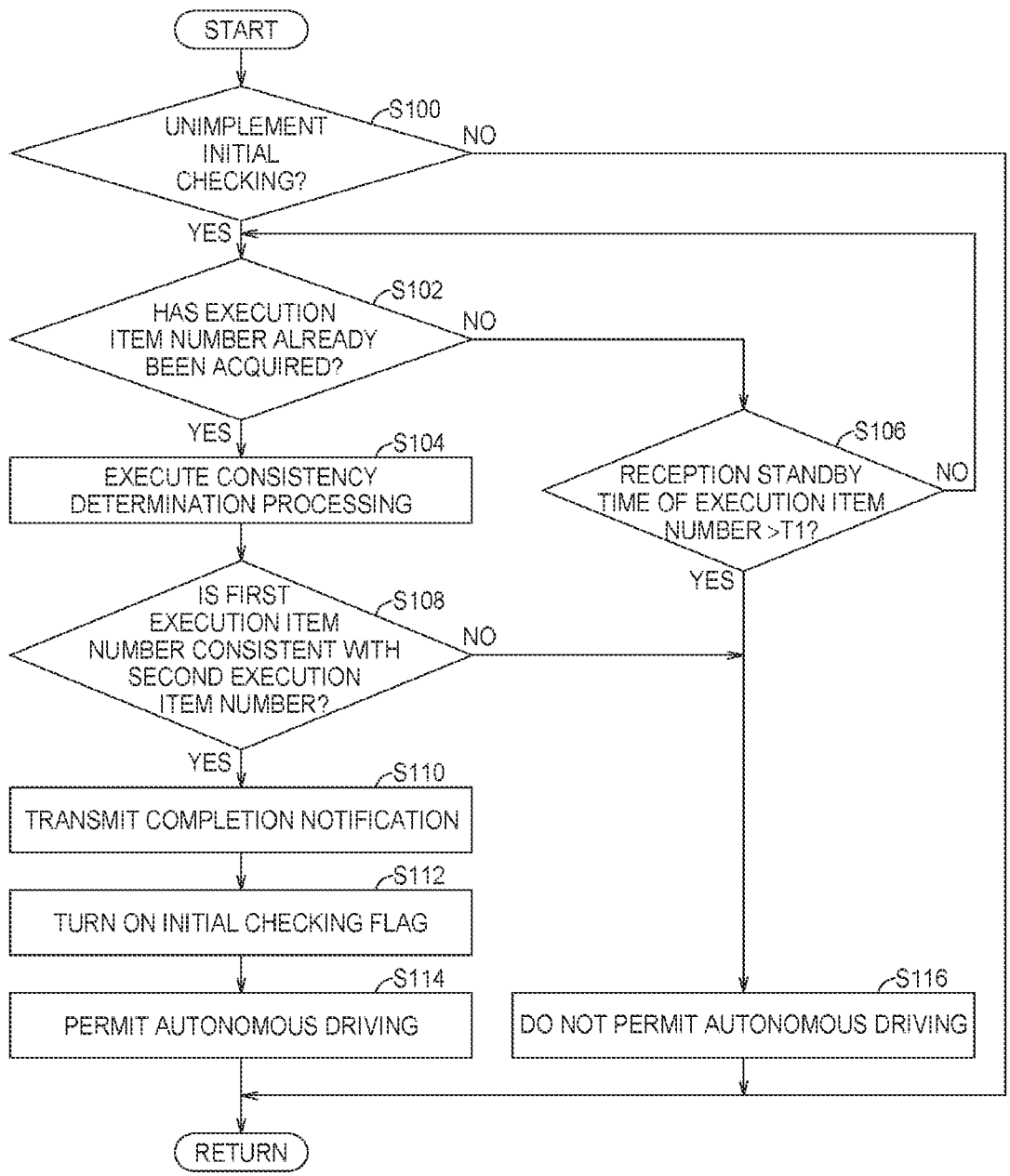
FIG. 5 is a flowchart illustrating an example of processing executed by the master ECU.

Hereinafter, an example of processing executed by the master ECU 200 is described with reference to FIG. 5. FIG. 5 is a flowchart illustrating an example of the processing executed by the master ECU 200. A series of processes illustrated in this flowchart are repeatedly executed by the master ECU 200 at each predetermined processing cycle.

At step (hereinafter, step is referred to as S) 100, the master ECU 200 determines whether an initial check has been unimplemented. The master ECU 200 determines whether the initial check is unimplemented based on, for example, a state of a flag indicating whether the initial check has been implemented. When, for example, the flag is in an OFF state, the master ECU 200 determines that the initial check has been unimplemented. The master ECU 200 may set the flag to the OFF state, for example, immediately after the start, or may set the flag to the OFF state when the electrified vehicle 100 becomes IG-OFF. When the master ECU 200 determines that the initial check has been unimplemented (YES in S100), the process proceeds to S102.

In S102, the master ECU 200 determines whether all the execution item numbers have been acquired. The master ECU 200 determines that all the execution item numbers have been acquired when, for example, the first execution item number and the second execution item number have been acquired. The master ECU 200 acquires, for example, the item number of the software stored in the start storage area of the memory 202 as the first execution item number. The master ECU 200 acquires the second execution item number from, for example, the slave ECU 210. When the master ECU 200 determines that all the execution item numbers have been acquired (YES in S102), the process proceeds to S104.

In S104, the master ECU 200 executes the consistency determination processing. The master ECU 200 determines whether the combination of the first execution item number and the second execution item number is the combination decided in advance. The master ECU 200 compares the combination of the first execution item number and the second execution item number with the combination stored in the memory 202 and decided in advance, and determines whether they match. Since the method of acquiring the combination decided in advance is as described above, detailed description thereof is not repeated. Thereafter, the process proceeds to S108. When the master ECU 200 determines that all the execution item numbers have not been acquired (NO in S102), the process proceeds to S106.

In S106, the master ECU 200 determines whether a reception standby time of the execution item numbers is longer than a predetermined time T1. The reception standby time may be, for example, an elapsed time since it is determined that the initial check has been unimplemented. The predetermined time T1 is adapted by, for example, experimentations or the like. When the master ECU 200 determines that the reception standby time of the execution item numbers is longer than the predetermined time T1 (YES in S106), the process proceeds to S116. When the master ECU 200 determines that the reception standby time of the execution item numbers is equal to or shorter than the predetermined time T1 (NO in S106), the process proceeds to S102.

In S108, the master ECU 200 determines whether the first execution item number and the second execution item number are consistent. For example, when the combination of the first execution item number and the second execution item number is a combination decided in advance, such as a combination of the item numbers of the software before the update or a combination of the item numbers of the software after the update, the master ECU 200 determines that the first execution item number and the second execution item number are consistent. When the master ECU 200 determines that the first execution item number and the second execution item number are consistent (YES in S108), the process proceeds to S110. When the master ECU 200 determines that the first execution item number and the second execution item number are not consistent (NO in S108), the process proceeds to S116.

In S110, the master ECU 200 transmits, to the slave ECU 210, information (hereinafter, referred to as a completion notification) indicating that the consistency determination processing has been completed. Thereafter, the process proceeds to S112.

In S112, the master ECU 200 sets a state of the flag indicating whether the initial check has been completed to the ON state. Thereafter, the process proceeds to S114.

In S114, the master ECU 200 sets the autonomous driving to a permitted state. When the autonomous driving is set to the permitted state, the autonomous driving of the electrified vehicle 100 using the ADS 240 can be implemented. For this reason, in the electrified vehicle 100, when the autonomous driving mode is selected, the autonomous driving using the ADS 240 is implemented.

In S116, the master ECU 200 sets the autonomous driving to an unpermitted state. In a case where the autonomous driving is set to the unpermitted state, when the autonomous driving mode is being selected, it is switched to the manual driving mode. Further, even when an operation for selecting the autonomous driving mode is executed while the manual operation mode is being selected, selection of the autonomous driving mode is rejected.

Figure 6:
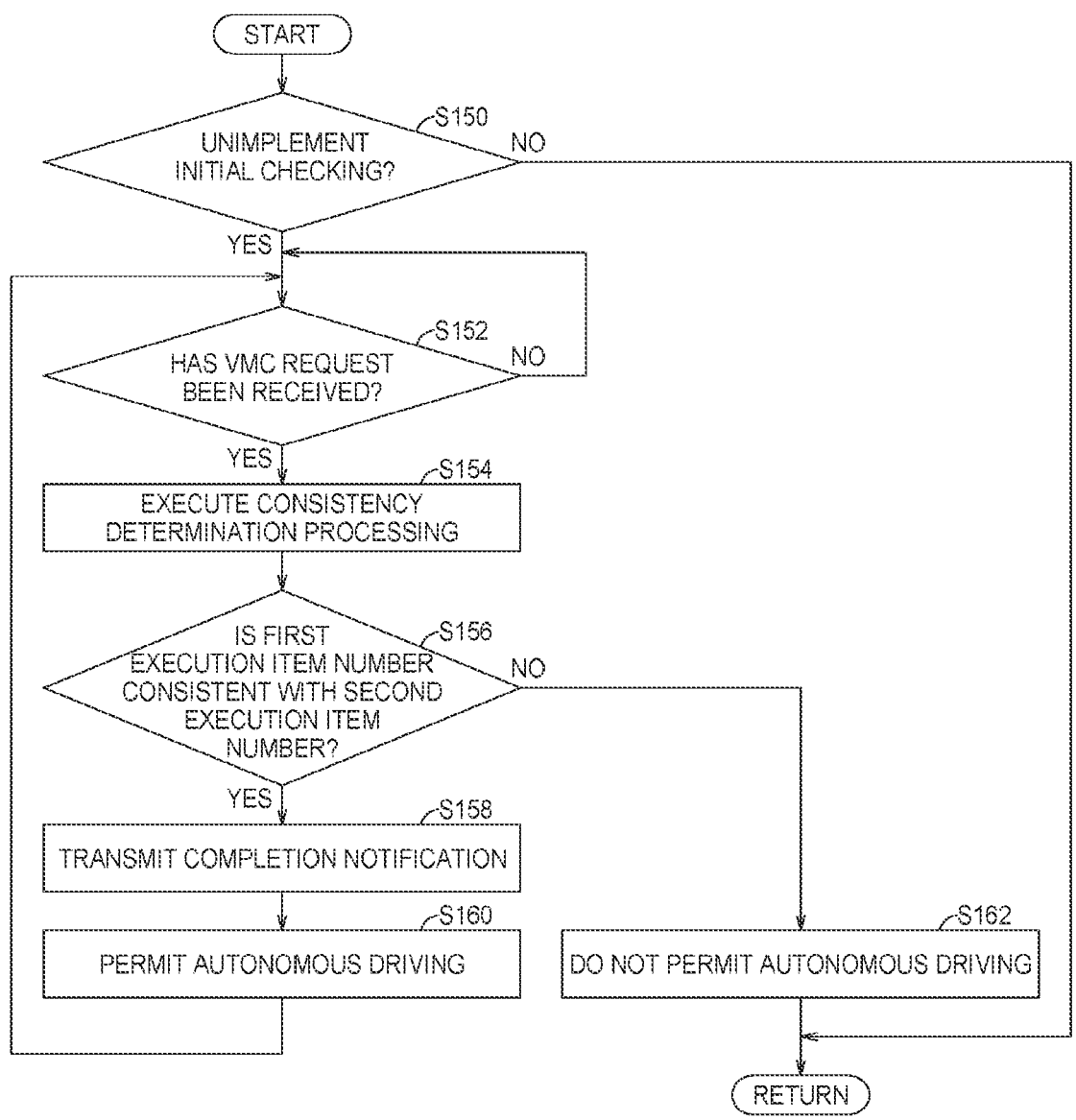
FIG. 6 is a flowchart illustrating another example of the processing executed by the master ECU.

Next, an example of another processing executed by the master ECU 200 is described with reference to FIG. 6. FIG. 6 is a flowchart illustrating an example of another processing executed by the master ECU 200. A series of processes illustrated in this flowchart are repeatedly executed by the master ECU 200 at each predetermined processing cycle.

In S150, the master ECU 200 determines whether the initial check has been implemented. Since the method of determining whether the initial check has been implemented is as described above, detailed description thereof not repeated. When the master ECU 200 determines that the initial check has been implemented (YES in S150), the process proceeds to S152.

In S152, the master ECU 200 determines whether a VMC request is received from the slave ECU 210. The "VMC request" includes a request for the execution of the consistency determination processing. When the master ECU 200 determines that the VMC request is received from the slave ECU 210 (YES in S152), the process proceeds to S154. When the master ECU 200 determines that the VMC request is not received (NO in S152), the process returns to S152.

In S154, the master ECU 200 executes the consistency determination processing. Since the method of executing the consistency determination processing is as described above, detailed description thereof is not repeated. Thereafter, the process proceeds to S156.

In S156, the master ECU 200 determines whether the first execution item number and the second execution item number are consistent. Since the method of the determination is as described above, detailed description thereof is not repeated. When the master ECU 200 determines that the first execution item number and the second execution item number are consistent (YES in S156), the process proceeds to S158.

In S158, the master ECU 200 transmits the completion notification to the slave ECU 210. Since the completion notification is as described above, detailed description thereof is not repeated.

In S160, the master ECU 200 sets the autonomous driving to the permitted state. Since the operation of the electrified vehicle 100 in the permitted state of the autonomous driving is as described above, detailed description thereof is not repeated. Thereafter, the process returns to S152. When the master ECU 200 determines that the first execution item number and the second execution item number are not consistent (NO in S156), the process proceeds to S162.

In S162, the master ECU 200 sets the autonomous driving to the unpermitted state. Since the operation of the electrified vehicle 100 in the unpermitted state of the autonomous driving is as described above, detailed description thereof is not repeated. Thereafter, the process ends. When the master ECU 200 determines that the initial check has not been implemented (NO in S150), the process ends.

Figure 7:
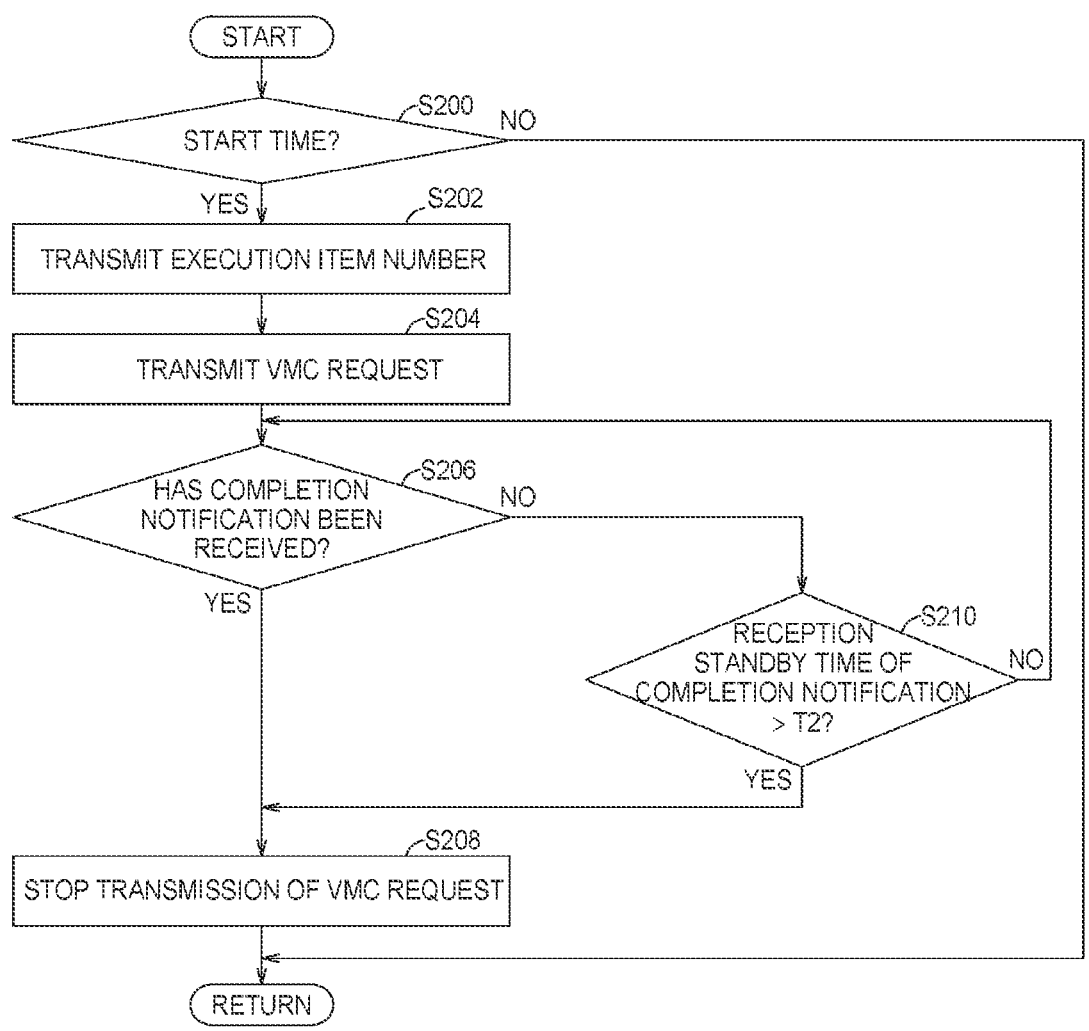
FIG. 7 is a flowchart illustrating an example of processing executed by the slave ECU.

Next, an example of processing executed by the slave ECU 210 is described with reference to FIG. 7. FIG. 7 is a flowchart illustrating an example of the processing executed by the slave ECU 210. A series of processes illustrated in this flowchart are repeatedly executed by the slave ECU 210 at each predetermined processing cycle.

In S200, the slave ECU 210 determines whether it is the time of the start. When, for example, start processing for starting the slave ECU 210 is being executed, the slave ECU 210 determines that it is the time of the start of the slave ECU 210. When the slave ECU 210 determines that it is the time of the start of the slave ECU 210 (YES in S200), the process proceeds to S202.

In S202, the slave ECU 210 transmits the second execution item number to the master ECU 200. Since the second execution item number is as described above, detailed description thereof is not repeated. Thereafter, the process proceeds to S204.

In S204, the slave ECU 210 transmits the VMC request. Since the VMC request is as described above, detailed description thereof is not repeated. The slave ECU 210 may intermittently transmit the VMC request each time a predetermined time elapses, or may continuously transmit the VMC request.

In S206, the slave ECU 210 determines whether the completion notification has been received from the master ECU 200. Since the completion notification is as described above, detailed description thereof is not repeated. When the slave ECU 210 determines that the completion notification has been received (YES in S206), the process proceeds to S208.

In S208, the slave ECU 210 stops the transmission of the VMC request. When the completion notification has not been received from the master ECU 200 (NO in S206), the process proceeds to S210.

In S210, the slave ECU 210 determines whether the reception standby time of the completion notification is longer than a predetermined time T2. The reception standby time of the completion notification may be, for example, an elapsed time from a point at which the VMC request has been sent. The predetermined time T2 is adapted by, for example, experimentations or the like. When the slave ECU 210 determines that the reception standby time of the completion notification is longer than the predetermined time T2 (YES in S210), the process proceeds to S208. When the slave ECU 210 determines that the reception standby time of the completion notification is equal to or shorter than the predetermined time T2 (NO in S210), the process returns to S206. Further, when the slave ECU 210 determines that it is not the time of the start of the slave ECU 210 (NO in S200), the process ends.

An example of operations of the master ECU 200 and the slave ECU 210 based on the above structure and the flowcharts is described with reference to FIG. 8.

Figure 8:
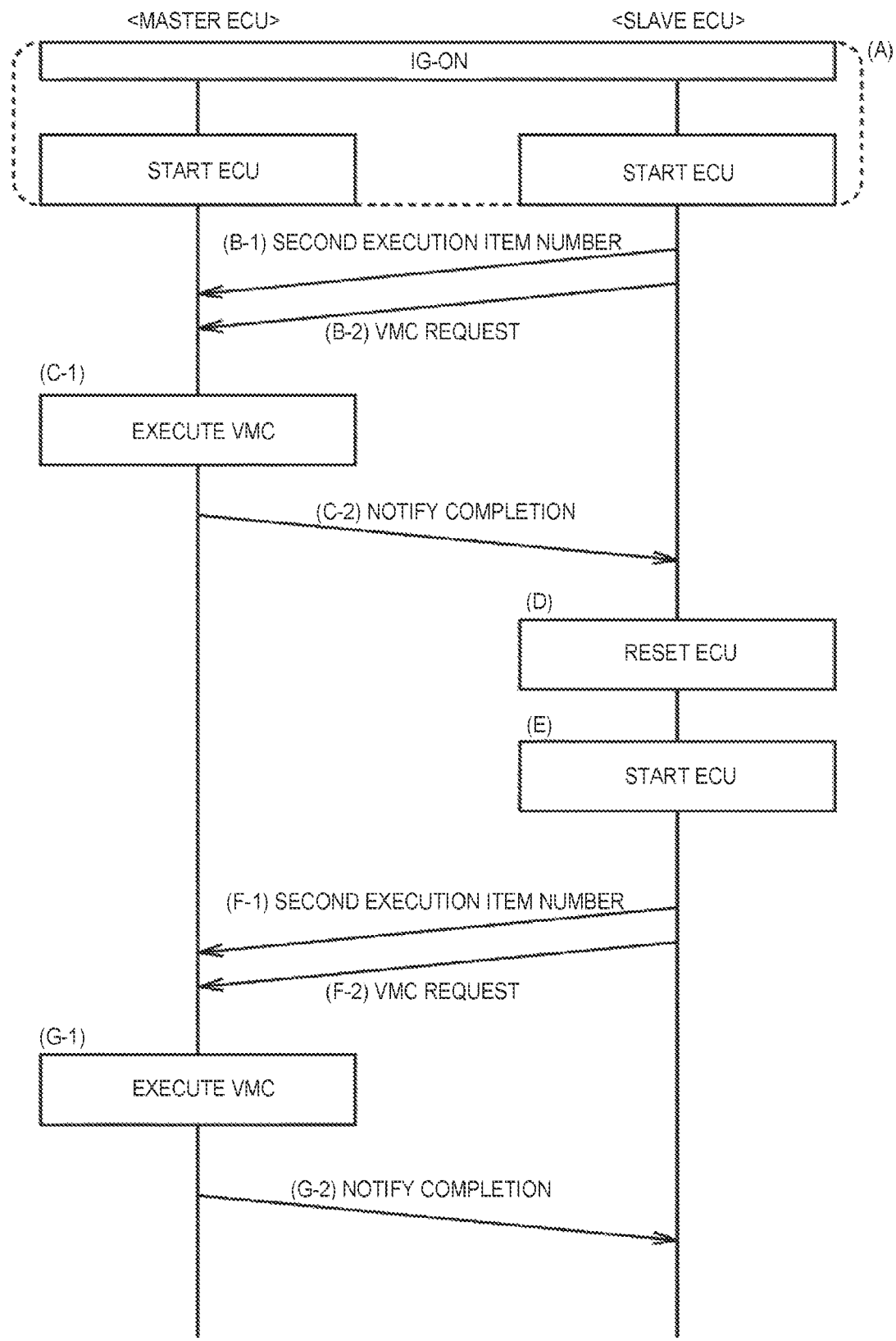
FIG. 8 is a diagram for describing an example of an operation of the master ECU and an example of an operation of the slave ECU.

FIG. 8 is a diagram for describing an example of the operation of the master ECU 200 and an example of the operation of the slave ECU 210. FIG. 8 illustrates operation histories of the master ECU 200 and the slave ECU 210.

For example, when the user executes the start operation for starting the system of the electrified vehicle 100, as illustrated in (A) of FIG. 8, the electrified vehicle 100 becomes IG-ON. When the electrified vehicle 100 becomes IG-ON, power is supplied from a power source to each of the master ECU 200 and the slave ECU 210 and the master ECU 200 and the slave ECU 210 are started.

When the slave ECU 210 determines that it is the time of the start (YES in S200), as illustrated in (B-1) of FIG. 8, the second execution item number is transmitted to the master ECU 200 (S202), and, as illustrated in (B-2) of FIG. 8, the VMC request is transmitted to master ECU 200 (S204).

When the master ECU 200 determines that the initial check is unimplemented (YES in S100), it is determined whether all the execution item numbers have been received (S102). When the first execution item number is acquired and the second execution item number is received from the slave ECU 210, it is determined that all the execution item numbers have been received (YES in S102), and, as illustrated in (C-1) of FIG. 8, the VMC is executed (S104). When the VMC is executed and the master ECU 200 determines that the first execution item number and the second execution item number are consistent (YES in S108), as illustrated in (C-2) of FIG. 8, the completion notification is transmitted to the slave ECU 210 (S110). Thereafter, the flag indicating whether the initial check has been implemented is set to the ON state (S112), and the autonomous driving is permitted (S114). Upon receiving the completion notification (YES in S206), the slave ECU 210 stops the transmission of the VMC request (S208).

for example, as illustrated in (D) of FIG. 8, it is assumed that the slave ECU 210 is reset due to some trouble. As such, as illustrated in (E) of FIG. 8, in a case where the slave ECU 210 is restarted, when the slave ECU 210 determines that it is the time of the start (YES in S200), as illustrated in (F-1) of FIG. 8, the second execution item number is transmitted to the master ECU 200 (S202). Then, as illustrated in (F-2) of FIG. 8, the VMC request is transmitted to the master ECU 200 (S204).

In the case where the master ECU 200 determines that the initial check has been implemented (YES in S150), when the VMC request is received from the slave ECU 210 (YES in S152), as illustrated in (G-1) of FIG. 8, the VMC is executed (S154). When the VMC is executed and the master ECU 200 determines that the first execution item number and the second execution item number are consistent (YES in S156), as illustrated in (G-2) of FIG. 8, the completion notification is transmitted to the slave ECU 210 (S158). Thereafter, the autonomous driving is permitted (S160). Upon receiving the completion notification (YES in S206), the slave ECU 210 stops the transmission of the VMC request (S208).

In this manner, the slave ECU 210 transmits the second execution item number and the VMC request each time of the start. Further, in the case where the initial check is unimplemented, the master ECU 200 executes the VMC by receiving the second execution item number from the slave ECU 210. Further, in the case where the initial check has been implemented, the master ECU 200 executes the VMC by receiving the VMC request from the slave ECU 210.

For this reason, for example, when the updated software is stored in the update storage areas of the master ECU 200 and the slave ECU 210 and the update storage areas are set as the start storage areas at the time of the next start, before the electrified vehicle 100 becomes IG-OFF, even when the slave ECU 210 is restarted due to some trouble occurring in the slave ECU 210 and the slave ECU 210 is started using the updated software, the VMC is promptly executed by the VMC request from the slave ECU 210 to the master ECU 200. When it is determined that the first execution item number and the second execution item number are not consistent by executing the VMC (NO in S156), the autonomous driving becomes the unpermitted state or the like (S162), and the execution of the function using the updated software only in the slave ECU 210 is restricted.

As described above, according to the in-vehicle system of the present embodiment, the master ECU 200 is requested to execute the VMC each time the slave ECU 210 is started, and the master ECU 200 executes the VMC. For this reason, in the case where the update storage area is set as the start storage area at the time of the next start, even when only the slave ECU 210 is restarted due to a trouble or the like, the VMC request is transmitted to the master ECU 200 at the time of the restart. As such, it is possible to early detect the inconsistency in the combination of the execution item numbers between the master ECU 200 and the slave ECU 210. Therefore, it is possible to provide the in-vehicle system and the control devices that early detect inconsistency in the combination of the identification information of the software in the control devices.

Further, when it is determined by the execution of the VMC that the first execution item number and the second execution item number are not consistent, the execution of the function (for example, the autonomous driving using the ADS 240) to be realized by the software stored in the start storage area becomes the unpermitted state (a prohibited state). In this manner, it is possible to restrict the function, such as the autonomous driving, from being executed in a state where the first execution item number and the second execution item number are not consistent.

Hereinbelow, modified examples will be described.

In the above-described embodiment, a configuration in which the ECUs mounted on the electrified vehicle 100 include the master ECU 200 and the slave ECU 210 has been described as an example, but the configuration may have the ECUs including the master ECU 200 and a plurality of ECUs. In this modified example, for example, a configuration in which the ECUs mounted on the electrified vehicle 100 include the master ECU 200, the first slave ECU 210A, and the second slave ECU 210B will be described as an example.

Figure 9:
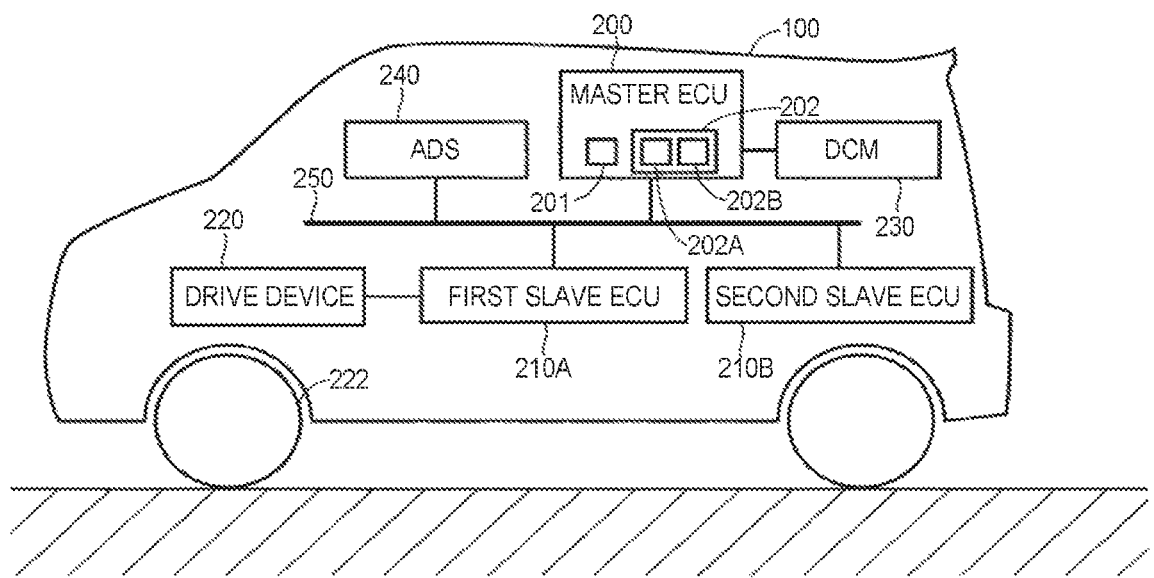
FIG. 9 is a diagram schematically illustrating an example of a configuration of the electrified vehicle in a modified example.

FIG. 9 is a diagram schematically illustrating an example of a configuration of the electrified vehicle 100 in the modified example. Compared to the configuration of the electrified vehicle 100 illustrated in FIG. 2, the electrified vehicle 100 illustrated in FIG. 9 differs in that it includes the first slave ECU 210A instead of the slave ECU 210 and further includes the second slave ECU 210B. Other configurations have the same configuration, and are denoted by the same reference signs. For this reason, detailed description thereof is not repeated.

For example, the first slave ECU 210A has the same configuration as the slave ECU 210 of FIG. 2. Compared to the first slave ECU 210A, the second slave ECU 210B has a different detection targets of sensors, control targets (for example, a steering system or a brake system) and control operations. Other configurations are similar to those of the slave ECU 210. For this reason, detailed description of each of the first slave ECU 210A and the second slave ECU 210B is not repeated.

Even in a configuration including a plurality of slave ECUs, the same problem as when there is a single slave ECU may occur.

Figure 10:
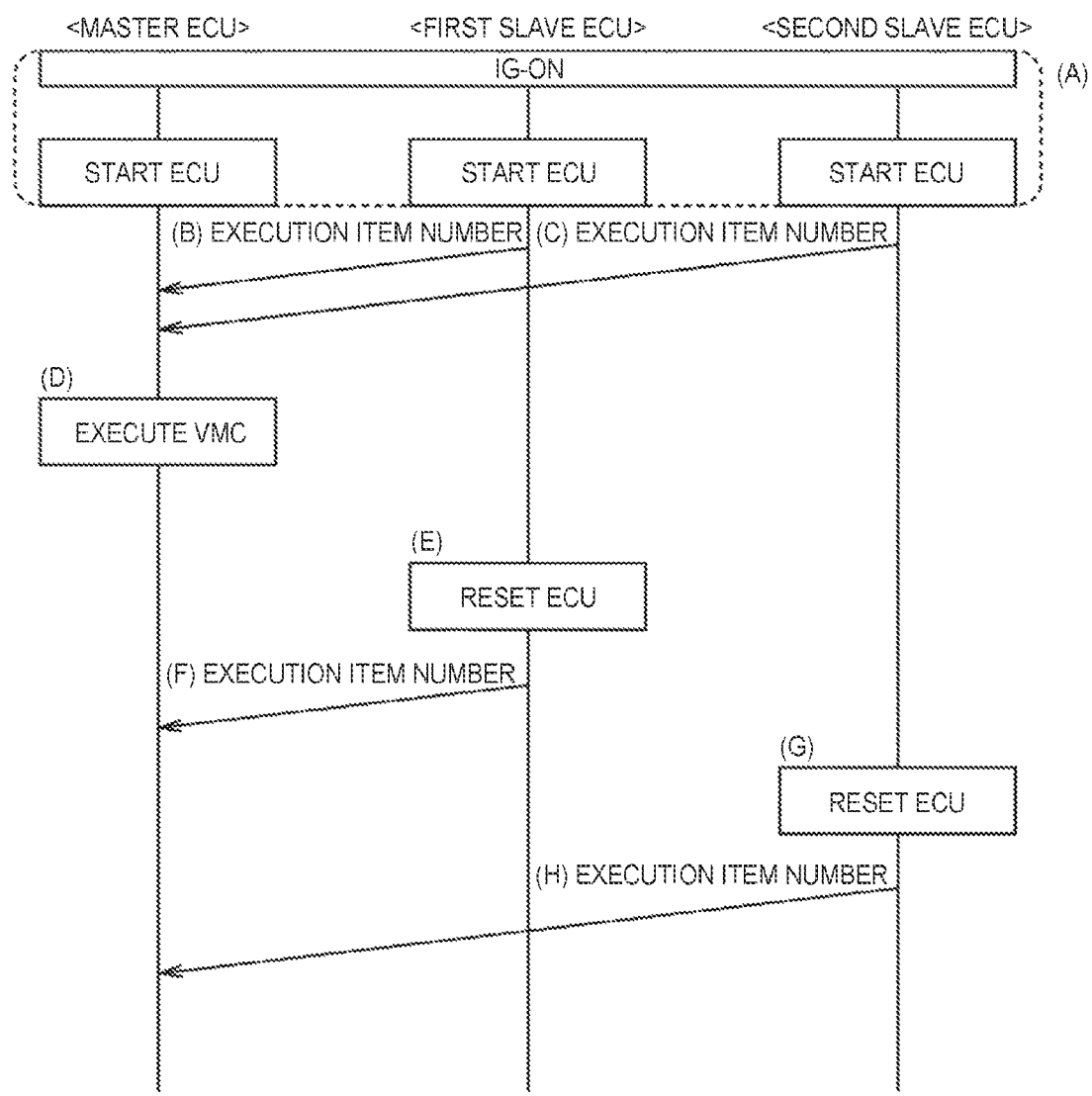
FIG. 10 is a diagram for describing an example of operations executed by the master ECU and the slave ECU in the modified example.

FIG. 10 is a diagram for describing an example of operations executed by the master ECU 200 and the slave ECUs in the modified example. FIG. 10 illustrates operation histories of the master ECU 200, the first slave ECU 210A, and the second slave ECU 210B.

For example, when the user executes a start operation for starting a system of the electrified vehicle 100, as illustrated in (A) of FIG. 10, the electrified vehicle 100 becomes IG-ON. When the electrified vehicle 100 becomes IG-ON, power is supplied from the power source to each of the master ECU 200, the first slave ECU 210A, and the second slave ECU 210B, and the master ECU 200, the first slave ECU 210A, and the second slave ECU 210B are started.

At this time, as illustrated in (B) of FIG. 10, in the first slave ECU 210A, for example, it is assumed that the item number of the software stored in the start storage area of a memory of the first slave ECU 210A after the start is transmitted to the master ECU 200 as the execution item number.

Further, as illustrated in (C) of FIG. 10, similar to the first slave ECU 210A, in the second slave ECU 210B, for example, it is assumed that the item number of the software stored in the start storage area of a memory of the second slave ECU 210B after the start is transmitted to the master ECU 200 as the execution item number.

As illustrated in (D) of FIG. 10, after the electrified vehicle 100 becomes IG-ON, the master ECU 200 executes the VMC by receiving the execution item number from the first slave ECU 210A and the second slave ECU 210B. As such, the master ECU 200 can determine whether a combination of the execution item numbers is consistent by whether a combination of the first execution item number of the software being executed in the master ECU 200, the second execution item number of the software being executed in the received first slave ECU 210A, and the third execution item number of the software being executed in the received second slave ECU 210B is the combination decided in advance. The combination of the execution item numbers decided in advance is acquired in the same manner as the combination of the two execution item numbers decided in advance in the embodiment described in advance. For this reason, detailed description thereof is not repeated.

However, in this case, in the same manner as in the embodiment described above, after the master ECU 200 instructs each of the first slave ECU 210A and the second slave ECU 210B to switch the start storage area at the time of the next start, when any one of the first slave ECU 210A and the second slave ECU 210B is restarted due to an occurrence of some trouble, such as momentary failure of power source that supplies power before the electrified vehicle 100 becomes IG-OFF, the switching of the start storage area may be executed only in the slave ECU.

For example, as illustrated in (E) of FIG. 10, when the first slave ECU 210A is reset due to an occurrence of some trouble, the first slave ECU 210A is restarted. At this time, as illustrated in (F) of FIG. 10, even when the execution item number is transmitted to the master ECU 200, the VMC is not executed in the master ECU 200. For this reason, since the execution item numbers of the master ECU 200 and the second slave ECU 210B become the item numbers before the update, and the execution item number of the first slave ECU 210A becomes the item number after the update before the time of the next start of the master ECU 200 and the second slave ECU 210B, a period in which the combination of the execution item numbers is inconsistent between the master ECU 200, the first slave ECU 210A, and the second slave ECU 210B occurs. In the same manner as when some trouble occurs in the second slave ECU 210B, in this case, a period in which the combination of execution item numbers is inconsistent may occur.

Then, in the modified example, at the time of the start of each of the first slave ECU 210A and the second slave ECU 210B, they request the master ECU 200 to execute the consistency determination processing for determining whether the identification information (that is, the execution item number) of the software stored in the start storage area is consistent between the master ECU 200, the first slave ECU 210A, and the second slave ECU 210B. In each of when the master ECU 200 is started and when it receives the request for the execution of the consistency determination processing from the first slave ECU 210A or the second slave ECU 210B, the master ECU 200 executes the consistency determination processing (the VMC).

In this manner, the master ECU 200 is requested to execute the consistency determination processing at the start of the first slave ECU 210A or the second slave ECU 210B, and executes the consistency determination processing. For this reason, in the case where the update storage area is set as the start storage area at the time of the next start, even when the first slave ECU 210A or the second slave ECU 210B is restarted due to a trouble or the like, the master ECU 200 is requested to execute the consistency determination processing at the restart. As such, it is possible to early detect the inconsistency in the combination of the execution item numbers between the master ECU 200, the first slave ECU 210A, and the second slave ECU 210B.

Figure 11:
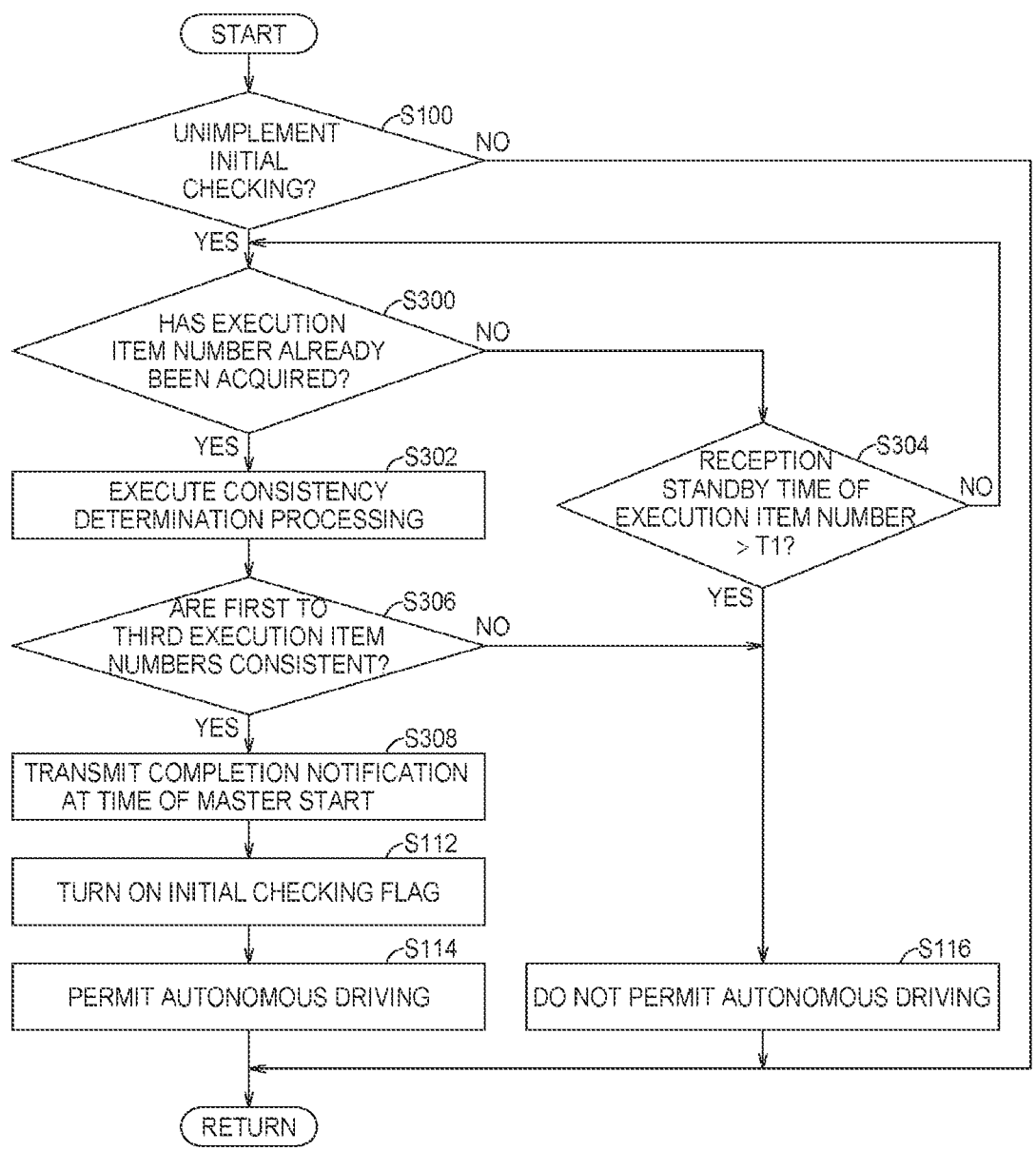
FIG. 11 is a flowchart illustrating an example of processing executed by the master ECU in the modified example.

Hereinafter, an example of processing executed by the master ECU 200 is described with reference to FIG. 11 in the modified example. FIG. 11 is a flowchart illustrating an example of the processing executed by the master ECU 200 in the modified example. A series of processes illustrated in this flowchart are repeatedly executed by the master ECU 200 at each predetermined processing cycle.

The flowchart of FIG. 11 differs from that of FIG. 5 in that processes of S300, S302, S304, S306, and S308 are executed in the former instead of the processes of S102, S104, S106, S108, and S110. In the flowchart of FIG. 11, the same step numbers are assigned to the same processes as in the flowchart of FIG. 5, and the contents of the processes are also the same except for cases described below. For this reason, detailed description thereof is not repeated.

When the master ECU 200 determines that the initial check has been unimplemented (YES in S100), the process proceeds to S300.

In S300, the master ECU 200 determines whether all the execution item numbers have been acquired. The master ECU 200 determines that all the execution item numbers have been acquired when, for example, the first execution item number, the second execution item number, and the third execution item number have been acquired. The master ECU 200 acquires, for example, the item number of the software stored in the start storage area of the memory 212 as the first execution item number. The master ECU 200 acquires the second execution item number from, for example, the first slave ECU 210A. Further, the master ECU 200 acquires the third execution item number from, for example, the second slave ECU 210B. When the master ECU 200 determines that all the execution item numbers have been acquired (YES in S300), the process proceeds to S302.

In S302, the master ECU 200 executes the consistency determination processing. The master ECU 200 determines whether the combination of the first execution item number, the second execution item number, and the third execution item number is the combination decided in advance. Thereafter, the process proceeds to S308. When the master ECU 200 determines that all the execution item numbers have not been acquired (NO in S300), the process proceeds to S304.

In S304, the master ECU 200 determines whether the reception standby time of the execution item numbers is longer than the predetermined time T1. Since the reception standby time and the predetermined time T1 are as described above, detailed description thereof is not repeated. When the master ECU 200 determines that the reception standby time of the execution item numbers is longer than the predetermined time T1 (YES in S304), the process proceeds to S116. When the master ECU 200 determines that the reception standby time of the execution item numbers is equal to or shorter than the predetermined time T1 (NO in S304), the process returns to S300.

In S306, the master ECU 200 determines whether the first execution item number, the second execution item number, and the third execution number are consistent. For example, when the combination of the first execution item number, the second execution item number, and the third execution item number is the combination decided in advance, such as the combination of the item numbers of the software before the update or the combination of the item numbers of the software after the update, the master ECU 200 determines that the first execution item number, the second execution item number, and the third execution item number are consistent. When the master ECU 200 determines that the first execution item number, the second execution item number, and the third execution item number are consistent (YES in S306), the process proceeds to S308. When the master ECU 200 determines that the first execution item number, the second execution item number, and the third execution item number are not consistent (NO in S306), the process proceeds to S116.

In S308, the master ECU 200 transmits the completion notification (hereinafter, referred to as a completion notification at the time of master start) of the consistency determination processing at the time of the master start. The master ECU 200 transmits the completion notification at the time of the master start to each of the first slave ECU 210A and the second slave ECU 210B. Thereafter, the process proceeds to S112.

Figure 12:
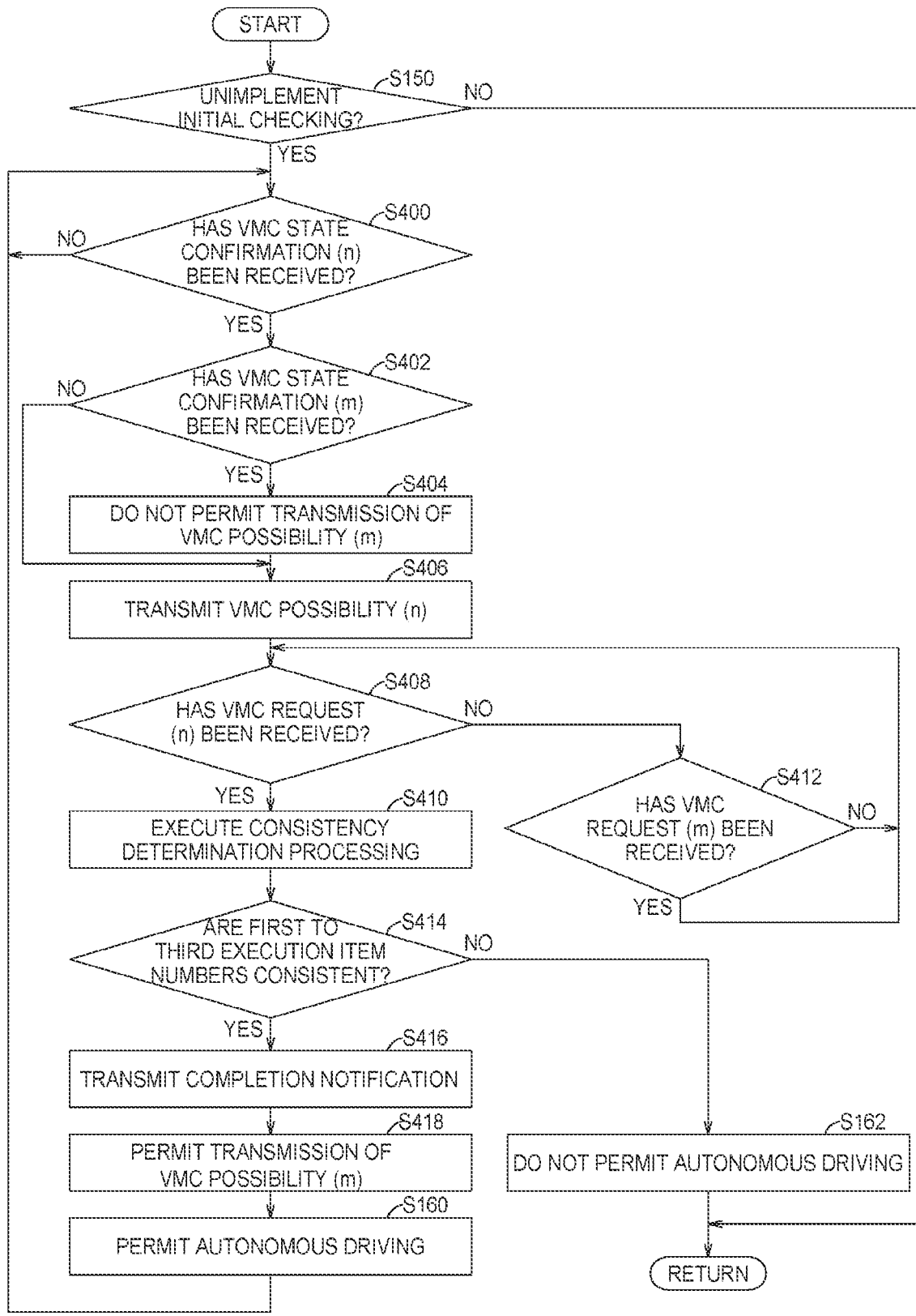
FIG. 12 is a flowchart illustrating an example of another processing executed by the master ECU in the modified example.

Next, another example of processing executed by the master ECU 200 is described with reference to FIG. 12 in the modified example. FIG. 12 is a flowchart illustrating an example of another processing executed by the master ECU 200 in the modified example. A series of processes illustrated in this flowchart are repeatedly executed by the master ECU 200 at each predetermined processing cycle.

The flowchart of FIG. 12 differs from that of FIG. 6 in that processes of S400, S402, S404, S406, S408, S410, S412, S414, and S416 are executed in the former instead of the processes of S152, S154, S156, and S158. In the flowchart of FIG. 12, the same step numbers are assigned to the same processes as in the flowchart of FIG. 6, and the contents of the processes are also the same except for cases described below. For this reason, detailed description thereof is not repeated.

When the master ECU 200 determines that the initial check has been unimplemented (YES in S150), the process proceeds to S400.

In S400, the master ECU 200 determines whether a VMC state confirmation (n) (n is 1 or 2) is received. Upon, for example, receiving a VMC state confirmation (1) from the first slave ECU 210A or upon receiving a VMC state confirmation (2) from the second slave ECU 210B, the master ECU 200 determines that the VMC state confirmation (n) has been received. Details of the VMC state confirmation (1) and the VMC state confirmation (2) will be described below. When the master ECU 200 determines that the VMC state confirmation (n) has been received (YES in S400), the process proceeds to S402. When the master ECU 200 determines that the VMC state confirmation (n) has not been received (NO in S400), the process returns to S400.

In S402, the master ECU 200 determines whether a VMC state confirmation (m) (m is 1 or 2 other than n) is received. Upon receiving the VMC state confirmation (1) in S400, the master ECU 200 determines whether to receive the VMC state confirmation (2). Alternatively, upon receiving the VMC state confirmation (2) in S400, the master ECU 200 determines whether to receive the VMC state confirmation (1). When the master ECU 200 determines that the VMC state confirmation (m) has been received (YES in S402), the process proceeds to S404. When the master ECU 200 determines that the VMC state confirmation (m) has not been received (NO in S402), the process proceeds to S406.

In S404, the master ECU 200 does not permit transmission of a VMC possibility (m), which is a notification indicating that the VMC can be executed. For example, upon receiving the VMC state confirmation (1) in S400, the master ECU 200 does not permit transmission of a VMC possibility (2) to the second slave ECU 210B. Alternatively, for example, upon receiving the VMC state confirmation (2) in S400, the master ECU 200 does not permit transmission of the VMC possibility (1) to the first slave ECU 210A. Thereafter, the process proceeds to S406.

In S406, the master ECU 200 transmits a VMC possibility (n). For example, upon receiving the VMC state confirmation (1) in S400, the master ECU 200 transmits the VMC possibility (1) to the first slave ECU 210A. The VMC possibility (1) includes information indicating that the VMC can be executed by the request of the first slave ECU 210A. Alternatively, for example, upon receiving the VMC state confirmation (2) in S400, the master ECU 200 transmits the VMC possibility (2) to the second slave ECU 210B. The VMC possibility (2) includes information indicating that the VMC can be executed by the request of the second slave ECU 210B. Thereafter, the process proceeds to S408.

In S408, the master ECU 200 determines whether a VMC request (n) is received. For example, upon receiving the VMC state confirmation (1) in S400, the master ECU 200 determines that the VMC request (n) has been received when it receives the VMC request (1) from the first slave ECU 210A. The VMC request (1) includes a VMC execution request to the master ECU 200 of which a transmission source is the first slave ECU 210A. Alternatively, for example, upon receiving the VMC state confirmation (2) in S400, the master ECU 200 determines that the VMC request (n) has been received when it receives the VMC request (2) from the second slave ECU 210B. The VMC request (2) includes the VMC execution request to the master ECU 200 of which the transmission source is the second slave ECU 210B. When the master ECU 200 determines that the VMC request (n) has been received (YES in S408), the process proceeds to S410.

In S410, the master ECU 200 executes the consistency determination processing. Since the consistency determination processing is the same as the process of S302, detailed description thereof is not repeated. Thereafter, the process proceeds to S414. When the master ECU 200 determines that the VMC request (n) has not been received (NO in S408), the process proceeds to S412.

In S412, the master ECU 200 determines whether the VMC request (m) has been received. For example, upon receiving the VMC state confirmation (1) in S400 and receiving the VMC request (2), the master ECU 200 determines that the VMC request (m) has been received. For example, upon receiving the VMC state confirmation (2) in S400 and receiving the VMC request (1), the master ECU 200 determines that the VMC request (m) has been received. When the master ECU 200 determines that the VMC request (m) has been received (YES in S412), the process returns to S408. When the master ECU 200 determines that the VMC request (m) has not been received (NO in S412), the process returns to S408.

In S414, the master ECU 200 determines whether the first execution item number, the second execution item number, and the third execution number are consistent. Since the determination method is as described above, detailed description thereof is not repeated. When the master ECU 200 determines that the first execution item number, the second execution item number, and the third execution item number are consistent (YES in S414), the process proceeds to S416. When the master ECU 200 determines that the first execution item number, the second execution item number, and the third execution item number are not consistent (NO in S414), the process proceeds to S162.

In S416, the master ECU 200 transmits the completion notification. The master ECU 200 transmits the completion notification to each of the first slave ECU 210A and the second slave ECU 210B. Thereafter, the process proceeds to S418.

In S418, the master ECU 200 permits the transmission of the VMC possibility (m). For example, master ECU 200 permits the transmission of the VMC possibility (m) by not permitting the transmission in S404. Thereafter, the process proceeds to S160.

Figure 13:
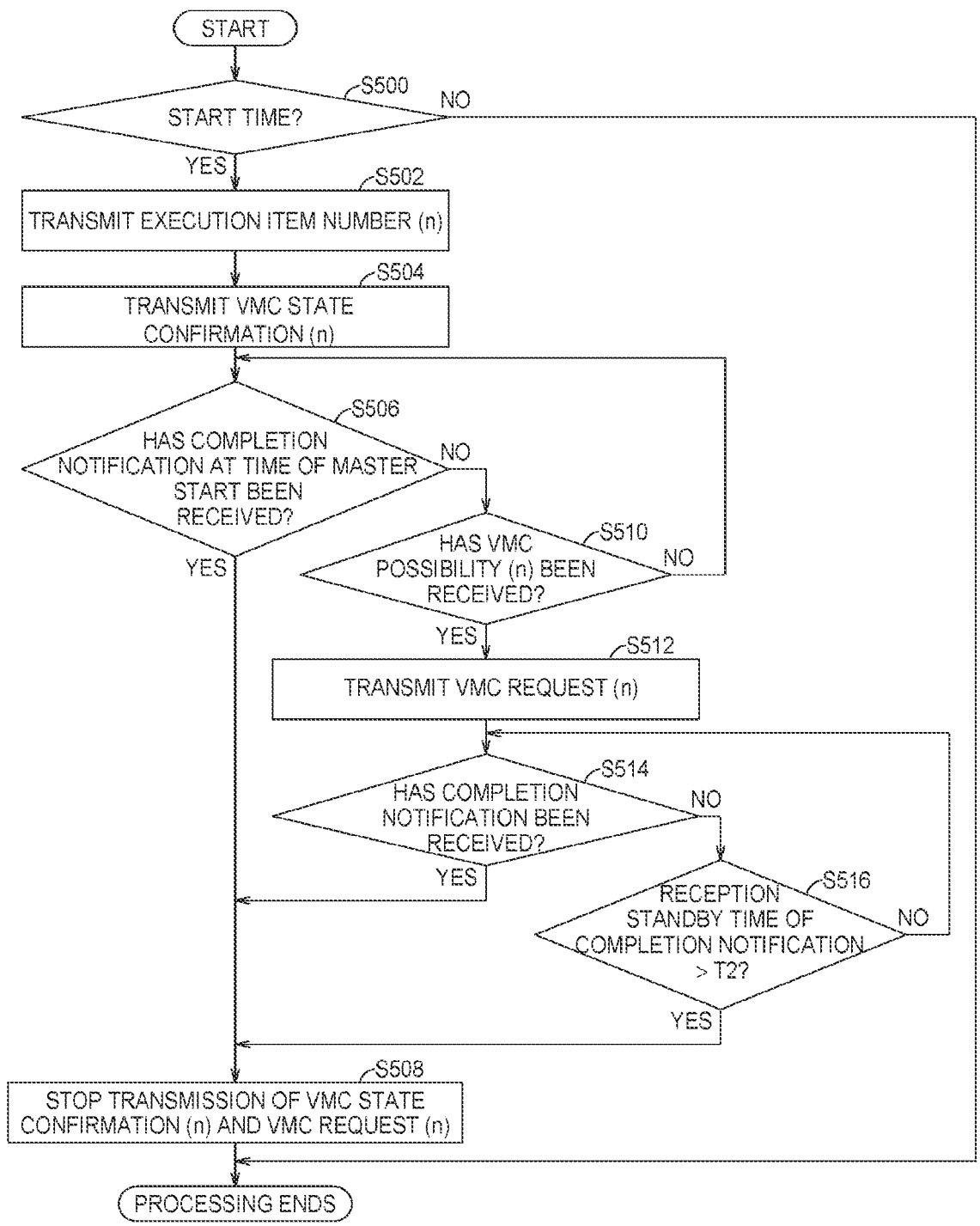
FIG. 13 is a flowchart illustrating an example of another processing executed by each of a first slave ECU and a second slave ECU in the modified example.

Next, an example of processing executed by each of the first slave ECU 210A and the second slave ECU 210B is described with reference to FIG. 13. FIG. 13 is a flowchart illustrating an example of another processing executed by each of the first slave ECU 210A and the second slave ECU 210B in the modified example. "n" illustrated in the flowchart illustrated in FIG. 13 is a value indicating an execution subject. For example, when n=1, the flowchart of FIG. 13 illustrates the processing in which the first slave ECU 210A is the execution subject. Further, when n=2, the flowchart of FIG. 13 illustrates the processing in which the second slave ECU 210B is the execution subject. In the following description, a case where execution subject of the processing illustrated in the flowchart of FIG. 13 is the first slave ECU 210A is described as an example. Since the same applies to a case where the second slave ECU 210B is the execution subject, detailed description thereof is not repeated.

In S500, the first slave ECU 210A determines whether it is the time of the start. Since the determination method is the same as the determination method in the process of S200 described above, detailed description thereof is not repeated. When the first slave ECU 210A determines that it is the time of the start (YES in S500), the process proceeds to S502. When the first slave ECU 210A determines that it is not the time of the start (NO in S500), the process ends.

In S502, the first slave ECU 210A transmits the second execution item number to master ECU 200 as the execution item number (n). Thereafter, the process proceeds to S504.

In S504, the first slave ECU 210A transmits the VMC state confirmation (1) to the master ECU 200 as the VMC state confirmation (n). Thereafter, the process proceeds to S506.

In S506, the first slave ECU 210A determines whether the completion notification at the time of the master start has been received. When the first slave ECU 210A determines that the completion notification at the time of the master start has been received (YES in S506), the process proceeds to S508.

In S508, the first slave ECU 210A stops the transmission of the VMC state confirmation (1) and the VMC request (1). For example, when the VMC state confirmation (1) is being transmitted, the first slave ECU 210A stops the transmission of the VMC state confirmation (1). Further, for example, when the VMC state confirmation (1) and the VMC request (1) are being transmitted, the first slave ECU 210A stops the transmission of the VMC state confirmation (1) and the VMC request (1). When the first slave ECU 210A determines that the completion notification at the time of the master start has not been received (NO in S506), the process proceeds to S510.

In S510, the first slave ECU 210A determines whether the VMC possibility (n) is received from the master ECU 200. Upon receiving the VMC possibility (1) from the master ECU 200, the first slave ECU 210A determines that the VMC possibility (n) has been received. When the first slave ECU 210A determines that the VMC possibility (n) has been received (YES in S510), the process proceeds to S512. When the first slave ECU 210A determines that the VMC possibility (1) has not been received (NO in S510), the process returns to S506.

In S512, the first slave ECU 210A transmits the VMC request (n) to the master ECU 200. The first slave ECU 210A transmits the VMC request (1) to the master ECU 200 as the VMC request (n). Thereafter, the process proceeds to S514.

In S514, the first slave ECU 210A determines whether the completion notification has been received from the master ECU 200. When the first slave ECU 210A determines that the completion notification has been received (YES in S514), the process proceeds to S508. When the first slave ECU 210A determines that the completion notification has not been received (NO in S514), the process proceeds to S516.

In S516, the first slave ECU 210A determines whether the reception standby time of the completion notification is longer than the predetermined time T2. Since the reception standby time of the completion notification and the predetermined time T2 are as described above, detailed description thereof is not repeated. When the first slave ECU 210A determines that the reception standby time of the completion notification is longer than the predetermined time T2 (YES in S516), the process proceeds to S508. When the first slave ECU 210A determines that the reception standby time of the completion notification is equal to or shorter than the predetermined time T2 (NO in S516), the process returns to S514.

The example of operations of the master ECU 200, the first slave ECU 210A, and the second slave ECU 210B based on the above flowcharts in the modified example is described with reference to FIG. 14.

Figure 14:
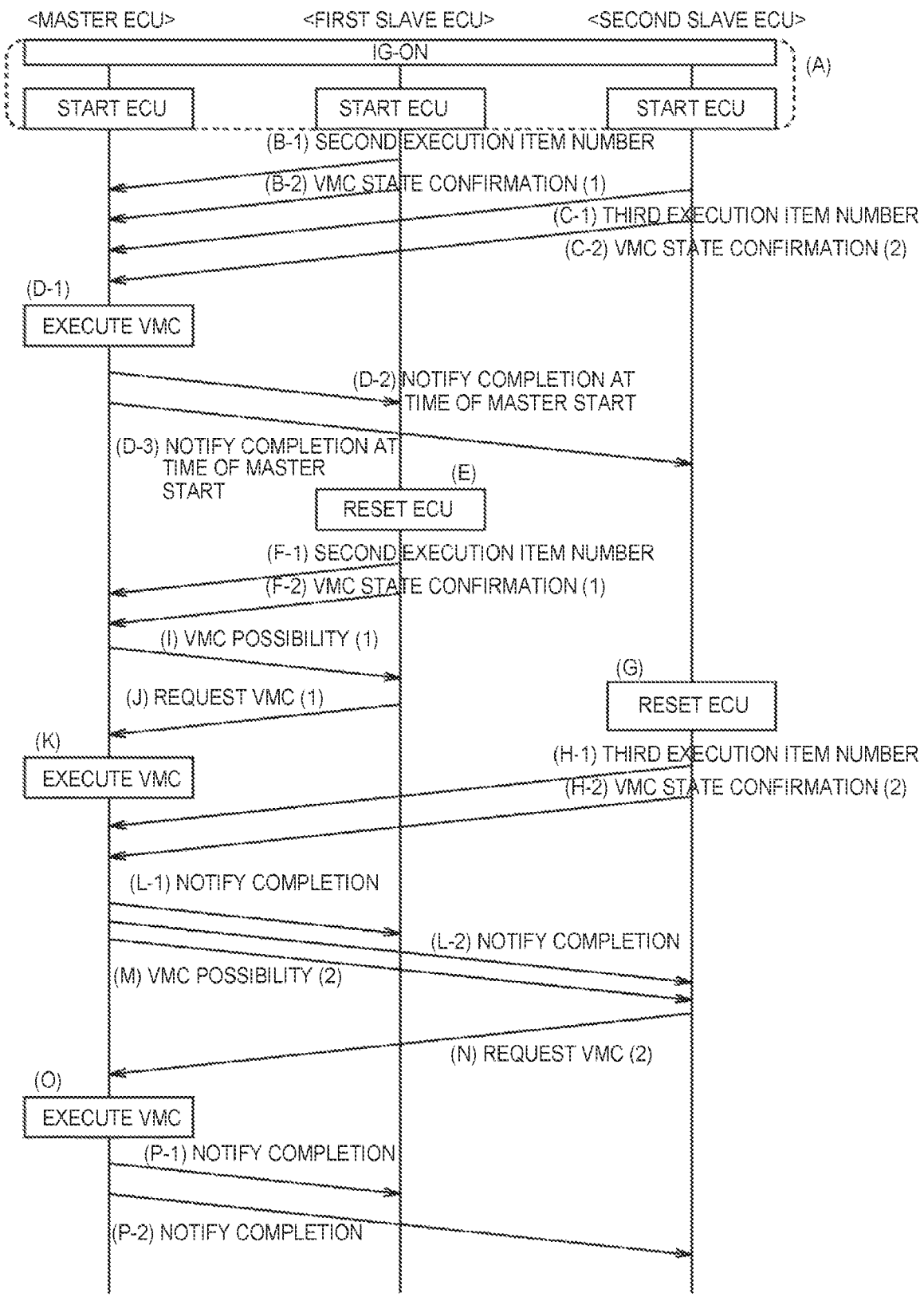
FIG. 14 is a diagram for describing each of an example of an operation of the master ECU and an example of an operation of the slave ECU in the modified example.

FIG. 14 is a diagram for describing an example of the operation of the master ECU 200 and an example of the operation of each slave ECU in the modified example. FIG. 14 illustrates operation histories of the master ECU 200, the first slave ECU 210A, and the second slave ECU 210B.

For example, when the user executes the start operation for starting the system of the electrified vehicle 100, as illustrated in (A) of FIG. 14, the electrified vehicle 100 becomes IG-ON. When the electrified vehicle 100 becomes IG-ON, power is supplied from the power source to each of the master ECU 200, the first slave ECU 210A, and the second slave ECU 210B, and the master ECU 200, the first slave ECU 210A, and the second slave ECU 210B are started.

When it is determined that the first slave ECU 210A is started (YES in S500), as illustrated in (B-1) of FIG. 14, the second execution item number is transmitted to the master ECU 200 (S502), and, as illustrated in (B-2) of FIG. 14, the VMC state confirmation (1) is transmitted to the master ECU 200 (S504).

In the same manner, when it is determined that the second slave ECU 210B is started (YES in S500), as illustrated in (C-1) of FIG. 14, the third execution item number is transmitted to the master ECU 200 (S502), and, as illustrated in (C-2) of FIG. 14, the VMC state confirmation (2) is transmitted to the master ECU 200 (S504).

When the master ECU 200 determines that the initial check is unimplemented (YES in S100), it is determined whether all the execution item numbers have been received (S300). When the first execution item number is acquired, the second execution item number is received from the first slave ECU 210A, and the third execution item number is received from the second slave ECU 210B, it is determined that all the execution item numbers have been received (YES in S300), and, as illustrated in (D-1) of FIG. 14, the VMC is executed (S302). When the VMC is executed and it is determined that the first execution item number, the second execution item number, and the third execution item number are consistent (YES in S306), the completion notification at the time of the master start is transmitted to each of the first slave ECU 210A and the second slave ECU 210B (S308). Thereafter, the flag indicating whether the initial check has been implemented is set to the ON state (S112), and the autonomous driving is permitted (S114).

Upon receiving the completion notification at the time of the master start (YES in S506), the first slave ECU 210A stops the transmission of the VMC state confirmation (1) (S508). Further, upon receiving the completion notification at the time of the master start (YES in S506), the second slave ECU 210B stops the transmission of the VMC state confirmation (2) (S508)

For example, as illustrated in (E) of FIG. 14, the first slave ECU 210A is reset due to some trouble. As such, in the case where the first slave ECU 210A is restarted, when it is determined that it is the time of the start (YES in S500), as illustrated in (F-1) of FIG. 14, the second execution item number is transmitted to the master ECU 200 (S502). Then, as illustrated in (F-2) of FIG. 14, the VMC state confirmation (1) is transmitted to the master ECU 200 (S504).

Upon determining that the initial check has been implemented (YES in S150), the master ECU 200 receives the VMC state confirmation (1) from the first slave ECU 210A. Then, when the VMC state confirmation (2) has not been received (NO in S402), as illustrated in (I) of FIG. 14, the VMC possibility (1) is transmitted to the first slave ECU 210A (S406).

When the first slave ECU 210A receives the VMC possibility (1) (YES in S510) without receiving the completion notification at the time of the master start (NO in S506), as illustrated in (J) of FIG. 14, the VMC request (1) is transmitted to the master ECU 200 (S512).

When the master ECU 200 receives the VMC request (1) (YES in S408), as illustrated in (K) of FIG. 14, the VMC is executed (S410). When the VMC is executed, it is determined whether the first execution item number, the second execution item number, and the third execution item number are consistent.

For example, as illustrated in (G) of FIG. 14, during the execution of the VMC, in a case where the second slave ECU 210B is reset due to some trouble and is restarted, when it is determined that it is the time of the start (YES in S500), as illustrated in (H-1) of FIG. 14, the third execution item number is transmitted to the master ECU 200 (S502), and, as illustrated in (H-2) of FIG. 14, the VMC state confirmation (2) is transmitted to the master ECU 200 (S504).

When the master ECU 200 determines that the first execution item number, the second execution item number, and the third execution item number are consistent (YES in S414), as illustrated in (L-1) of FIG. 14, the completion notification is transmitted to the first slave ECU 210A, and, as illustrated in (L-2) of FIG. 14, the completion notification is transmitted to the second slave ECU 210B (S416). Then, the transmission of the VMC possibility (2) is maintained in the permitted state (S418), and the autonomous driving is permitted (S160).

Upon receiving the completion notification (YES in S514), the first slave ECU 210A stops the transmission of the VMC state confirmation (1) and the VMC request (1) (S508).

On the other hand, since the transmission of the VMC state confirmation (2) from the second slave ECU 210B to the master ECU 200 is continued, it is determined that the VMC state confirmation (2) has been received (YES in S400), and when the VMC state confirmation (1) has not been received (NO in S402), as illustrated in (M) of FIG. 14, the VMC possibility (2) is transmitted to the second slave ECU 210B (S406).

When the second slave ECU 210B receives the VMC possibility (2) (YES in S510) without receiving the completion notification at the time of the master start (NO in S506), as illustrated in (N) of FIG. 14, the VMC request (2) is transmitted to the master ECU 200 (S512).

When the master ECU 200 receives the VMC request (2) (YES in S408), as illustrated in (O) of FIG. 14, the VMC is executed (S410). When the VMC is executed, it is determined whether the first execution item number, the second execution item number, and the third execution item number are consistent.

When the master ECU 200 determines that the first execution item number, the second execution item number, and the third execution item number are consistent (YES in S414), as illustrated in (P-1) of FIG. 14, the completion notification is transmitted to the first slave ECU 210A, and, as illustrated in (P-2) of FIG. 14, the completion notification is transmitted to the second slave ECU 210B (S416). Then, the transmission of the VMC possibility (1) is maintained in the permitted state (S418), and the autonomous driving is permitted (S160).

When the second slave ECU 210B receives the completion notification (YES in S514), the transmission of the VMC state confirmation (2) and the VMC request (2) is stopped (S508).

In this manner, in the first slave ECU 210A the second execution item number and the VMC state confirmation (1) are transmitted each time of the start, and the VMC request (1) is transmitted when the VMC can be executed. Further, in the second slave ECU 210B, the third execution product number and the VMC state confirmation (2) are transmitted each time of the start, and the VMC request (2) is transmitted when the VMC can be executed.

Further, in the case where the initial check is unimplemented, the VMC is executed when the master ECU 200 receives the second execution production number and the third execution production number. Further, in the case where the initial check has been implemented, the VMC is executed when the master ECU 200 receives the VMC request (1) after the transmission/reception of the VMC state confirmation (1) and the VMC possibility (1). Alternatively, in the case where the initial check has been implemented, the VMC is executed when the master ECU 200 receives the VMC request (2) after the transmission/reception of the VMC state confirmation (2) and the VMC possibility (2).

For this reason, for example, when the updated software is stored in the update storage areas of the master ECU 200, the first slave ECU 210A, and the second slave ECU 210B and the update storage areas are set as the start storage areas at the time of the next start, before the electrified vehicle 100 becomes IG-OFF, even when at least one of the first slave ECU 210A and the second slave ECU 210B is restarted due to an occurrence of some trouble and is started using the updated software, the VMC is promptly executed by the VMC request from the first slave ECU 210A or the second slave ECU 210B. When it is determined that the first execution item number, the second execution item number, and the third execution item number are not consistent by executing the VMC (NO in S414), the autonomous driving becomes the unpermitted state or the like (S162), and the execution of the function using the updated software only in the first slave ECU 210A or the second slave ECU 210B is restricted.

As above, with the in-vehicle system according to this modified example, even when two or more slave ECUs are included, it is possible to early detect inconsistency in the combination of the identification information of the software in the control devices.

When the initial check has been implemented (YES in S150), it is assumed that both the first slave ECU 210A and the second slave ECU 210B are restarted at different timings due to the occurrence of some trouble in any one of them, and the VMC state confirmation (2) has been received immediately after the reception of the VMC state confirmation (1). In this case, until the next completion notification is transmitted, since the transmission of the VMC possibility (2) is not permitted, the transmission of the VMC possibility (2) in response to the reception of the VMC state confirmation (2) is restricted. In this manner, it is possible to restrict the execution of the VMC from being requested from both the first slave ECU 210A and the second slave ECU 210B in parallel.

In this modified example, it is described that, in a case where the completion notification of the VMC for the VMC request (1) is received from the first slave ECU 210A, when the transmission of the VMC state confirmation (2) from the second slave ECU 210B is continued, the VMC is executed by the transmission/reception of the VMC possibility (2) and the VMC request (2) from the master ECU 200. However, for example, the possibility of the execution of the VMC may be determined using the content (for example, the content indicating that the execution item number is consistent, or not consistent) of notification of the completion notification. For example, when the content of notification of the completion notification indicates that the execution item numbers are consistent, it is determined that the VMC is not executed redundantly, or when the content of notification of the completion notification indicates that the execution item numbers are not consistent, it is determined that the VMC is executed again. In this manner, it is possible to restrict the VMC from being unnecessarily executed.

Further, in this modified example, an example is described that, in the case where the initial check has been implemented, when the VMC is executed in response to the VMC request from one of the first slave ECU 210A and the second slave ECU 210B and the VMC is executed in response to the VMC request from the other thereof. However, when the VMC is executed in response to the VMC request from one thereof, the VMC does not have to be executed even when the VMC request is received from the other thereof. In this manner, it is possible to restrict the VMC from being unnecessarily executed.

Further, in this modified example, an example is described that, in the case where the initial check has been implemented, when the VMC is executed in response to the VMC request from one of the first slave ECU 210A and the second slave ECU 210B and the VMC is executed in response to the VMC request from the other thereof after the reception of the completion notification. However, when the completion notification has not been received for a certain period, the VMC may be executed in response to the VMC request from the other thereof.

All or part of the modified example described above may be combined as appropriate and implemented.

The embodiments disclosed in the present disclosure should be considered as illustrative in all points, and not be considered as limited. The scope of the present disclosure is defined by the claims, not by the above description, and is intended to include meanings equivalent to the claims and all modifications within the scope thereof

What is claimed is:

1. An in-vehicle system comprising
a plurality of control devices, each of which comprises at least one processor and a memory, and is configured to:
set, as a start storage area, any one of a plurality of storage areas set as storage areas that store software; and
be started using the software stored in the start storage area,
the control devices including a master control device and a slave control device,
the master control device being configured to, when software stored in a storage area different from the start storage area is updated in the slave control device, transmit, to the slave control device, a switching instruction for setting the storage area that stores the updated software as the start storage area,
the slave control device being configured to
implement, when receiving the switching instruction, setting of the start storage area at a time of a next start, and
request, at every start, the master control device to execute consistency determination processing for determining whether pieces of identification information of the software stored in the start storage area are consistent between the control devices, and
the master control device being configured to, when receiving the request for execution of the consistency determination processing from the slave control device, execute the consistency determination processing, and, after the master control device executes the consistency determination processing in response to execution of a start operation for starting the in-vehicle system, execute the consistency determination processing again upon receiving the request for the execution of the consistency determination processing from the slave control device during an operation of the in-vehicle system.

2. The in-vehicle system according to claim 1, wherein the master control device is configured to, when determining that the pieces of identification information of the software stored in the start storage area are not consistent between the control devices, prohibit execution of a function implemented by the software.

3. The in-vehicle system according to claim 1, wherein:
the master control device is configured to transmit a completion notification to the slave control device after completion of the consistency determination processing; and
the slave control device is configured to, using the completion notification, determine whether to request the execution of the consistency determination processing.

4. The in-vehicle system according to claim 3, wherein the slave control device is configured to:
request the master control device to determine executability of the consistency determination processing at a time of the start; and
determine, using a determination result of the executability and the completion notification from the master control device, whether to request the execution of the consistency determination processing.

5. The in-vehicle system according to claim 4, wherein:
the slave control device includes a first control device and a second control device; and
the master control device is configured to, when receiving the request for a determination of the executability from the first control device in a case where the request for the determination of the executability is not received from the second control device before the first control device, transmit, to the first control device, a determination result indicating the executability of the consistency determination processing.

6. The in-vehicle system according to claim 5, wherein the master control device is configured to, when receiving the request for the determination of the executability from the second control device after the request for the determination of the executability from the first control device, prohibit a transmission of the determination result to the second control device.

7. The in-vehicle system according to claim 1, wherein:
the master control device is configured to transmit, to the slave control device, a first completion notification of the consistency determination processing that is executed at a time of a start and a second completion notification of the consistency determination processing that is executed when the execution of the consistency determination processing is requested from the slave control device; and
the slave control device is configured to:
stop, when receiving the first completion notification and the second completion notification, requesting the execution of the consistency determination processing; and
request, when not receiving the first completion notification, the execution of the consistency determination processing.

8. A control device that is any control device from among a plurality of control devices configured to set, as a start storage area, any one of a plurality of storage areas set as storage areas that store software, and to be started using the software stored in the start storage area, the control device comprising one or more processors configured to:
transmit, when software stored in a storage area different from the start storage area is updated in another control device, to the other control device, a switching instruction for setting the storage area that stores the updated software as the start storage area, the other control device being configured to implement, when receiving the switching instruction, setting of the start storage area at a time of a next start; and
receive, at every start of the other control device, a request for execution of consistency determination processing for determining whether pieces of identification information of the software stored in the start storage area are consistent between the control devices;
execute, when receiving the request for the execution of the consistency determination processing from the other control device, the consistency determination processing; and
after executing the consistency determination processing in response to execution of a start operation for starting an in-vehicle system, execute the consistency determination processing again upon receiving the request for the execution of the consistency determination processing from the other control device during an operation of the in-vehicle system.

9. A control device that is any control device from among a plurality of control devices configured to set, as a start storage area, any one of a plurality of storage areas set as storage areas that store software, and to be started using the software stored in the start storage area, the control device comprising one or more processors configured to:
implement, when software stored in a storage area different from the start storage area is updated and a switching instruction for setting the storage area that stores the updated software as the start storage area is received, setting of the start storage area at a time of a next start; and
request, at every start, a master control device that is any one of the control devices to execute consistency determination processing for determining whether pieces of identification information of the software stored in the start storage area are consistent between the control devices, the master control device being configured to, when receiving the request for execution of the consistency determination processing from the control device, execute the consistency determination processing, wherein the master control device is configured to, after the master control device executes the consistency determination processing in response to execution of a start operation for starting the in-vehicle system, execute the consistency determination processing again upon receiving the request for the execution of the consistency determination processing during an operation of the in-vehicle system.

* * * * *